US007467202B2

(12) United States Patent
Savchuk

(10) Patent No.: US 7,467,202 B2
(45) Date of Patent: Dec. 16, 2008

(54) HIGH-PERFORMANCE NETWORK CONTENT ANALYSIS PLATFORM

(75) Inventor: Gene Savchuk, Bethesda, MD (US)

(73) Assignee: Fidelis Security Systems, Bethesda, MD (US)

( * ) Notice: Subject to any disclaimer, the term of this patent is extended or adjusted under 35 U.S.C. 154(b) by 867 days.

(21) Appl. No.: 10/658,777

(22) Filed: Sep. 10, 2003

(65) Prior Publication Data

US 2005/0055399 A1    Mar. 10, 2005

(51) Int. Cl.
  *G06F 15/16*    (2006.01)
  *G06F 17/30*    (2006.01)
(52) U.S. Cl. ......................................... 709/224; 726/26
(58) Field of Classification Search ................. 709/224; 726/26
  See application file for complete search history.

(56) References Cited

U.S. PATENT DOCUMENTS 7,315,891 B2    1/2008  Donahue

| 2003/0110131 | A1  | 6/2003 | Alain et al. |
| 2003/0158822 | A1* | 8/2003 | Kawaguchi ................... 705/75 |
| 2004/0103202 | A1  | 5/2004 | Hilderbrand et al. |
| 2004/0128554 | A1  | 7/2004 | Maher, III et al. |
| 2005/0039034 | A1* | 2/2005 | Doyle et al. ................. 713/193 |
| 2007/0061276 | A1* | 3/2007 | Sato et al. ....................... 707/1 |

OTHER PUBLICATIONS

International Search Report, Issued Sep. 22, 2006.

* cited by examiner

*Primary Examiner*—Kenny S Lin
(74) *Attorney, Agent, or Firm*—Scott Chambers Patton Boggs LLP

(57) ABSTRACT

One implementation of a method reassembles complete client-server conversation streams, applies decoders and/or decompressors, and analyzes the resulting data stream using multi-dimensional content profiling and/or weighted keyword-in-context. The method may detect the extrusion of the data, for example, even if the data has been modified from its original form and/or document type. The decoders may also uncover hidden transport mechanisms such as, for example, e-mail attachments. The method may further detect unauthorized (e.g., rogue) encrypted sessions and stop data transfers deemed malicious. The method allows, for example, for building 2 Gbps (Full-Duplex)-capable extrusion prevention machines.

18 Claims, 31 Drawing Sheets

HIGH-PERFORMANCE NETWORK CONTENT ANALYSIS PLATFORM

RESERVATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to network communications. More particularly, the present invention relates to providing network content analysis, for example, to prevent leaks of information and/or to detect rogue encryption.

DESCRIPTION OF BACKGROUND INFORMATION

Content scanning in general is a relatively well-developed area. In most applications, content scanning is keyword-based; however, more advanced applications use regular expressions or statistical methods of pattern matching/document classification. The methods themselves have been applied to many document classification problems. An example of a successful application of statistical classifiers is Spam filtering, where Bayesian classifiers demonstrate 98% correctness.

The area of Digital Asset Protection (e.g., preventing information leaks through network channels) is rather new. Commercial systems so far borrow the approaches and tools from existing areas, concentrating on off-line analysis of data for the presence of keywords. The most developed part of Digital Asset Protection is e-mail scanners, working as add-ons to e-mail delivery and exchange software. Products in this area offer keyword-based and regexp-based filtering and are focused on preventing attempts to pass offensive or other improper e-mails to the outside world, protecting a company from possible litigation.

The Digital Asset Protection area recently started to attract attention, especially because of the U.S. government's privacy initiatives such as, for example, the Gramm-Leach-Bliley Act ("GLBA") targeted at financial institutions and the Health Insurance Portability and Accountability Act ("HIPAA") for health care providers. Leakages of credit card numbers and medical records, for example, cost companies millions of dollars in liabilities. Accordingly, these events should be stopped.

BRIEG DESCRIPTION OF THE DRAWINGS

Figure 1:
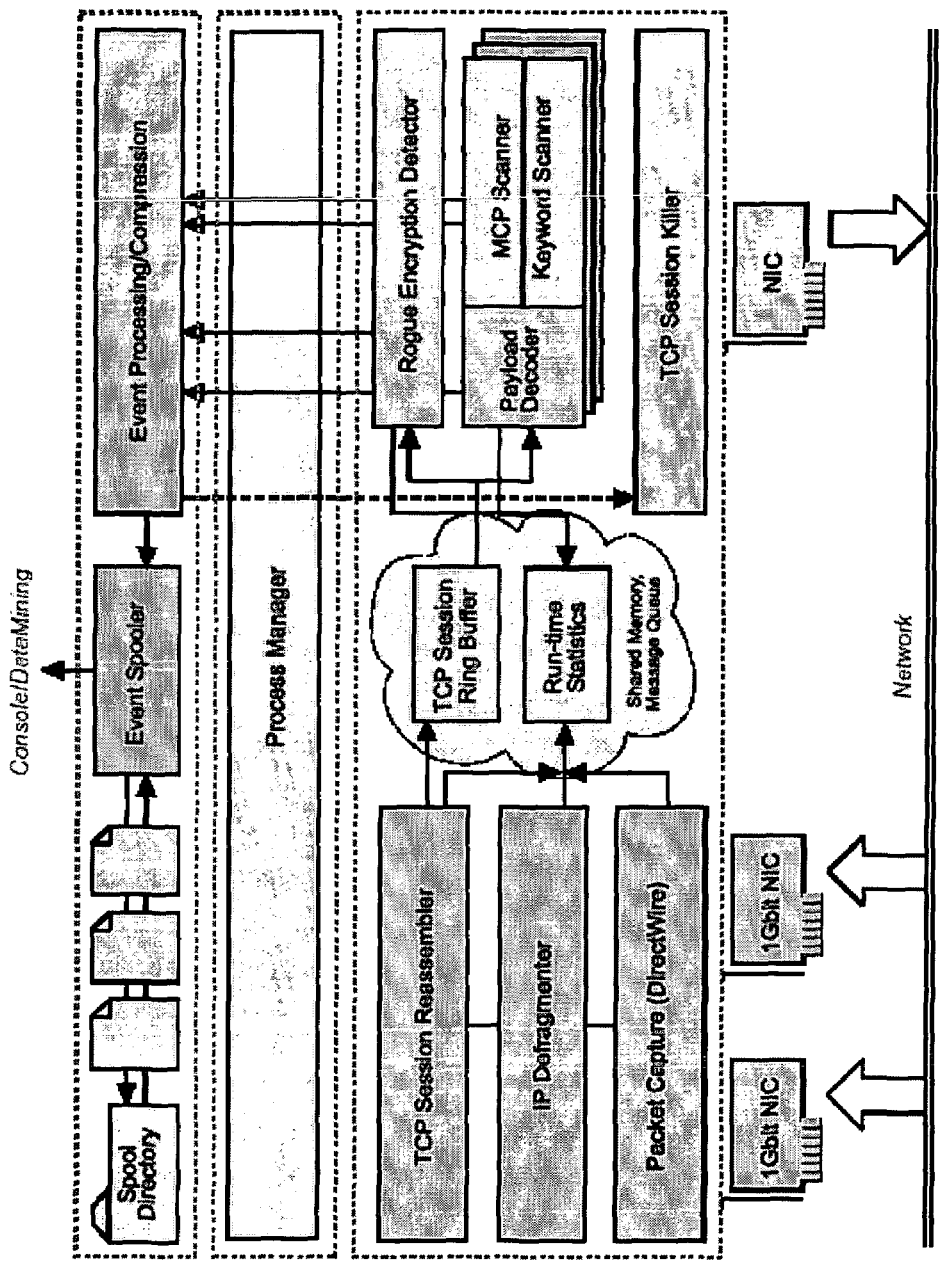
FIG. 1 depicts a block diagram of one embodiment of a network content analysis platform.

| List of Acronyms | |
|---|---|
| GLBA | Gramm Leach Blailey Act |
| HIPAA | Health Insurance Portability and Accountability Act |
| IP | Internet Protocol |
| TCP | Transport Control Protocol |
| DF | Digital Fingerprinting |
| HTML | Hypertext Markup Language |
| FSA | Finite State Automata |
| PDF | Portable Document Format |
| HTTP | Hyper Text Transfer Protocol |
| FTP | File Transfer Protocol |
| XML | extensible markup language |
| SSN | Social Security Number |
| OS | Operating System |
| API | Application Programming Interface |
| NIC | Network Interface Card |

List of Acronyms

| | |
|---|---|
| FD | Full Duplex |
| SPAN | Switched Port Analyzer |
| CPU | Central Processing Unit |
| SMP | Symmetric Multi-Processing |
| IPC | Inter-Process Communication |
| DoS | Denial of Service |
| PCAP | Packet Capture |
| PLR | Packet Loss Ratio |
| RAM | Random Access Memory |
| FDC | Free Descriptor Chain |
| SMTP | Simple Mail Transfer Protocol |
| MCP | Multi-dimensional Content Profiling |
| MIME | Multi-purpose Internet Mail Extension |
| TAR | Tape Archive |
| AKD | Automatic Keyword Discovery |
| AIR | Alert Information Record |
| DRM | Digital Rights Management |
| ACP | Automatic Content Profiler |
| FIFO | First In-First Out |
| VM | Virtual Machine |
| ASCII | American Standard Code for Information Interchange |
| CCN | Credit Card Number |
| VPN | Virtual Private Network |
| RED | Rogue Encryption Detector |
| SSL/TLS | Secure Socket Layer/Transport Layer Security |
| NCAP | Network Content Analysis Platform |
| MUTEX | Mutually-Exclusive Lock |
| UDP | User Datagram Protocol |
| ACL | Access Control List |
| SNMP | Simple Network Management Protocol |
| ROM | Read-Only Memory |

DETAILED DESCRIPTION

Nearly every organization maintains valuable information on its network, including, for example, patient records, customer credit card numbers, chemical formulations and/or customer lists. Over the last six years, approximately 20 percent of organizations surveyed have acknowledged network theft of proprietary information. In that time, their reported economic losses have increased 850 percent, making theft of proprietary information the largest source of economic loss from computer misuse.

Organizations may use indirect methods—basic network security practices such as, for example, hacker defense, software patches, user authentication and physical security—to guard their data. A more direct method would be to watch the flow (e.g., outflow) of data itself, for example, alone and/or combined with one or more indirect methods.

One embodiment of the present invention provides a method of monitoring and preventing information flow (e.g., outflow). The information may include sensitive information, private information and/or a digital asset such as, for example, intellectual property. The method may capture network traffic and provide content scanning and recognition, for example, in real time and/or off-line. The method may be used to detect and/or prevent (i) the unauthorized movement of data, (ii) leaks of information and/or (iii) bulk transfers of a digital asset. The digital asset may include customer lists, client and patient records, financial information, credit card numbers and/or social security numbers.

The method may reassemble complete client-server conversation streams, apply decoders and/or decompressors, and/or analyze the resulting data stream using one or more content scanners. The one or more content scanners may include multi-dimensional content profiling, weighted keyword-in-context and/or digital fingerprinting. The method may also perform deep packet inspection dealing with individual network packets. The method may further provide one or more layers of content decoding that may "peel off," for example, common compression, aggregation, file formats and/or encoding schemas and may extract the actual content in a form suitable for processing. In addition, the decoders may uncover hidden transport mechanisms such as, for example, e-mail attachments. The method may profile (e.g., statistically and/or keyword profile) data and detect the outflow of the data, for example, even if the data has been modified from its original form and/or document type. The method may also detect unauthorized (e.g., rogue) encrypted sessions and stop data transfers deemed malicious. The method may operate on real-time network traffic (e.g., including 1 Gbps networks) and may allow, for example, for building a Full-Duplex-capable (e.g., one or more Gbps) machine for preventing the unauthorized transfer of information.

Multidimensional content profiling may capture characteristics of a document (e.g., text, binary data, data file), and may tolerate variance that is common in the document lifetime: editing, branching into several independent versions, sets of similar documents, etc. It may be considered as the successor to both keyword scanning and fingerprinting, and may combine the power of both techniques.

Keyword Scanning is a relatively effective and user-friendly method of document classification. It is based on a set of very specific words, matched literally in the text. Dictionaries used for scanning include words inappropriate in communication, code words for confidential projects, products, and/or processes and other words that can raise the suspicion independently of the context of their use. Matching can be performed by a single-pass matcher based on a setwise string matching algorithm. As anybody familiar with Google can attest, the signal-to-noise ratio of keyword searches varies from good to unacceptable, depending on the uniqueness of the keywords themselves and the exactness of the mapping between the keywords and concepts they are supposed to capture.

Digital Fingerprinting ("DF") may pinpoint the exact replica of a certain document and/or data file with the rate of false positives approaching zero. The method may calculate message digests by a secure hash algorithm (e.g., SHA-1 and MD5). DF may detect unauthorized copying of a particular data file and/or verify that a file has not been tampered. Applications of DF to Extrusion Detection problem are scarce because of high sensitivity of DF to small changes in content; few if any real life data sets, for example, that constitute confidential information and intellectual property are "frozen" in time and available only in the original form. Incomplete information (e.g., a part of a document) or the same information in a different form (e.g., Word document sent as HTML) or the same document with an extra punctuation character may pass a DF-based detector completely unnoticed. Despite these drawbacks, DF still can be useful as a second layer on top of some method for factoring out variations in content (e.g., case folding, white space normalization, word order normalization, word stemming, use of SOUNDEX codes instead of words)

Content profiling may include one or more techniques to identify documents belonging to a certain document class. Documents in the same class share similar statistical characteristics, determined in the course of a preparatory process such as, for example, profiling. Profiling may utilize a representative set of documents belonging to the class (positive learning set), accompanied with documents similar to, but not belonging to the class (negative learning set). The profiling process for a class may be performed once; the resulting set of statistical characteristics (e.g., the profile) may be used to test for membership in the class.

The quality of a profile may depend on the ability of the profiling algorithm to capture characteristics common to all documents in the class; it can be improved by use of multiple unrelated characteristics of different nature. Each characteristic may define a dimension (e.g., a quantitative measure varying from one document to another). Content profiling of a security device may use a plurality of different characteristics (e.g., more than 400 different characteristics), which may be calculated in real time for data passing through the network. Each document passing through the network may be mapped to a single point in a multi-dimensional space; its position in this space may be used to calculate class membership (e.g., membership in more than one class can be identified) and trigger an alert and/or reactive measure.

Content profiling methods has been used by crypto analytics for centuries; ancient Romans knew simple methods of analysis based on variations in frequency of individual letters. Although still valuable, simple statistical characteristics work best when complemented by high-level statistical methods, operating on larger elements such as, for example, words and sentences.

A multi-dimensional profiler may operate with a plurality (e.g., about 200) of low-level statistical measures, the remaining may be high-level ones. High-level statistics may be designed with certain generic problem areas in mind (e.g., protecting confidential personal information related to individuals' health records, bank account information, customer lists, credit card information, postal addresses, e-mails, individual history, etc.); it can be re-targeted to other areas by adding new domain-specific dimensions.

In addition to individual high-and low-level characteristics summarizing overall usage of the given elements, the profiler may have a plurality (e.g., over 100) dimensions dedicated to spatial structure of the document, including mutual co-occurrence and arrangement of the elements. As an example, it can capture that in postal addresses, state names and Zip codes have very similar frequency, interleaving each other with Zip codes closely following state names. Spatial analysis may be used for capturing the overall structure of a document; indexes, lexicons, and other types of documents that can have usage patterns similar to the target class cannot easily fool it.

Profiling a learning set of documents may generate as many points in the multidimensional attribute space, as are documents in the set. Each point may represent an individual document (or a section of a document) and may be marked as "+" (in a class) or "−" (not in a class). The final learning act may calculate the simplest partitioning of the attribute space that separates "+" and "−" points with minimal overlap. This partitioning may be automatically "digitized" into a data-driven algorithm based on Finite State Automata ("FSA") that may serve as a fast single-pass scanning engine able to identify a "face in the crowd," for example, with high confidence and at wire speed.

The method may include the following features, individually or in combination:
monitoring network traffic at the packet level to identify and prevent the extrusion of data (e.g., company data);
focus on 'bulk' transfers of digital assets such as, for example, customer lists, client and patient records, etc.;
real-time network-based, for example, with minimal configuration requirements;
TCP session reassembly;
uncovering and analyzing all layers of traffic (e.g., PDF, Ethernet, IP, TCP, HTTP);
multi-level decoding of all popular protocols used for data transfers (e.g., e-mail, FTP, HTTP);
deep inspection of nested data layers (e.g., attachments, ZIP archives);
inspection of popular data formats (e.g., MS Word, MS Excel, HTML, XML, plain text);
statistical and/or keyword-based detection;
one or more tools for automatic profiling and keyword discovery to tailor the method's behavior to local data;
multidimensional analysis, for example, taking into account document structure;
domain-specific high-level features for statistical analysis (e.g., SSNs, credit card numbers, postal addresses, e-mail addresses);
on-time reaction, closing of illegal communications in real time; and/or
detection of rogue encryption (e.g., unauthorized encrypted communication channels).

One or more of these features may be incorporated into a network appliance. The appliance may be self-contained, task-focused, and/or may make it possible to establish and enforce a set of network use policies related to a company's digital assets.

The method may be installed, for example, on off-the-shelf Linux Operating System ("OS") and Intel-based hardware, and may allow the appliance to function as a standalone network appliance. The method may use a Linux system APIs for network packet capturing. The method may also use Linux-specific real-time scheduling facilities and standard UNIX Inter-Process Communication ("IPC") channels. The method may further use a UNIX networking API for general management purposes (e.g., configuration, sending alert information to remote console). The method may also utilize one or more Network Interface Cards ("NICs") for packet capturing. The NICs may not be fully activated by the OS (e.g., no IP address assigned) and may be used in "promiscuous" mode. The method may listen to an arbitrary number of NICs, for example, in FD/SPAN modes. Multiple instances of the method may also run on the appliance. The method may include a TCP Session Killer module to tear down malicious TCP sessions, and may use a separate NIC for injecting packets into the specified network segment.

A machine-readable medium (e.g., CD) may be programmed with the method, for example, to be installed on any Linux 7.3+ running on PC hardware with Pentium IV and/or higher CPU. Gigabit Intel NICs may be used for network sniffing. The appliance may include a 64-bit PCI/X bus and corresponding Intel Pro 64-bit 1 Gbps cards.

An appliance installation may include three acts:
installation of a hardened Linux kernel and the necessary set of Linux utilities;
installation of the software with the method; and/or
configuration/tuning of the software to match the specific hardware configuration.

FIG. 1 illustrates one embodiment of a system (e.g., a platform) including several modules. The system may be suitable for a variety of applications, for example, accessing all layers of network traffic including the content of TCP/IP network data exchanges. The system may be capable of operating on fully saturated Gigabit traffic using, for example, commodity hardware (e.g., multiprocessor Intel/Linux boxes with Gigabit NICs). The system may be scalable, and may allow for effective utilization of one or more CPUs in Symmetric Multi-Processing ("SMP") configuration, for example, by breaking up the network sniffing and analytical applications into several modules communicating via IPC.

The system provides effective and accurate reconstruction of network data exchanges. The system may (1) capture individual packets traveling through the network, for example, with the help of the network interface card operating in the promiscuous mode, (2) decode the packets uncovering the underlying transport layer (e.g., IP), (3) merge fragmented packets, (4) track the ongoing bi-directional data exchanges (e.g., sessions) and, for TCP sessions, (5) reassemble both sides of each data session, making their entire content available for a content analysis layer.

Such reconstruction is complicated by several factors. One of the factors is speed: modern networking equipment supports the latest Gigabit Ethernet standard, so many network segments operate on effective speeds reaching 700-800 Mbps or higher. To keep up with such a connection, the sniffing component may be sufficiently fast so that every packet is captured and there is enough time left for analysis of its content (e.g., individually or as a part of the session). Another factor is accuracy: the sniffer, being a passive application, may not have all the information needed to reconstruct all traffic in all cases (to do so, it should have access to internal state of the communicating hosts). The situation becomes even more complicated if the sniffer analyzes Full Duplex stream or asymmetrically routed traffic—several related network streams may be captured via separate NICs and analyzed as a single communication channel.

Existing open-source and proprietary solutions for this problem fall short on many counts. The effective ones rely on special hardware such as IBM's PowerNP network processor; those that do not are too slow and inaccurate to be useful in realistic high-speed network environments.

A system that solves this problem may not even rely on any special hardware. The system may provide packet sniffing, defragmentation, decoding, IP and TCP session tracking, reassembly and/or analysis of layers 2-7, for example, at Gigabit speeds. In addition, the system may include a unified event processing backend with temporary event storage and event spooler.

The system may be designed to take advantage of multiple CPUs, providing scalability for content analysis algorithms. This scalability may be achieved by breaking the full application to multiple modules and connecting them via flexible IPC mechanisms, suitable for the given configuration. The platform's API may include the following methods of connecting the processing modules:

Inline. The packet analyzer may be compiled together with the framework to the same executable and take its time share in the main packet processing cycle. This method may be suitable for single-processor hardware.

Packet-level parallel. After being decoded and initially processed, for example, by the EP and TCP reassemblers, the packet may be made available for further analysis to a separate process using a circular queue. For example, one or more (e.g., up to 32) external analyzers may be attached to a single queue. An option may also include to set up several independent queues, with round-robin packet distribution between them. and/or Stream-level parallel. A TCP stream reassembler may put the reassembled stream data into a circular stream queue. This queue may serve the programs designed to analyze the content of an entire client-server conversation. For example, one or more (e.g., up to 32) external analyzers may be connected to a single queue. Also, multiple queues may be configured, with round-robin distribution between them.

Both inline and external content analysis components may generate events, for example, by calling up the central event processing component via a message-based API. The event processing component may run in a separate process with regular priority; it may get events from the input queue and may write them to the temporary file storage. The persistent event storage may be used to withstand network outages with minimal information loss.

The event processing component may be designed to minimize the possible effect of Denial of Service ("DoS") attacks against the sniffer itself. It may react to a series of identical or similar events by compressing the entire series into one "combined" event that stores all the information in compressed form; for identical events, the combined event may contain information from a single event together with the event count.

The information collected by the event processor may be sent to its destination (e.g., a separate event analysis component such as, for example, a data mining console), for example, by an event spooling component. The event spooler may keep track of new events as they are written into a spool directory. Each new event may be encrypted and sent to one or more destinations. The event spooler may run as a separate low-priority process.

Packet Capture

One embodiment of a packet capture module (see, for example, FIG. 1) may be configured for fast and reliable packet capturing and/or a Gigabit-capable network sniffer. In single-NIC half-duplex mode, the packet capture module may offer 2× speedup over conventional packet capturing methods on stock hardware (e.g., libpcap on a Linux/Intel box with Gigabit Intel NICs). This speedup may be achieved by keeping time-consuming activities such as, for example, hardware interrupts, system calls and data copying to a minimum, leaving more time to packet processing. The real-life network traffic is heterogeneous. Usual packet size distribution tends to have maximums at about 80 bytes and 1500 bytes. The packet rate distribution over time may be highly uneven. Unlike the legitimate destination host, a network sniffer may have no ability to negotiate packet rates according to it needs. Therefore, it may be designed to provide adequate buffering for the traffic being sniffed and, as such, a sizeable processing window per each packet.

Each hardware interrupt potentially causes a context switch, a very expensive operation on a modern Intel CPU. To keep interrupts to a minimum, the packet capture module may utilize customized Intel NIC drivers making full use of Intel NIC's delayed-interrupt mode. The number of system calls may be reduced by taking advantage of the so-called "turbo" extension to packet socket mode supported by latest Linux kernels (e.g., PACKET_RX_RING socket option).

When used to their full potential, modified drivers and turbo mode may provide the fastest possible access to NIC's data buffers; polling at 100% capacity causes only about 0.001 interrupt/system call per captured packet (amortized). To deal with momentary surges in traffic, the packet capture module may allocate several megabytes for packet buffers. Large buffers may also reduce packet loss caused by irregular delays introduced by IP defragmenter and TCP reassembler.

The packet capture module may operate in FD/SPAN modes using multiple NICs, providing support for full session reassembly. Packets coming from multiple NICs operating in promiscuous mode may be interleaved by polling several packet buffers simultaneously. The polling strategy may not introduce additional context switches or system calls; each buffer may get its share of attention.

The packet capture module may be implemented as several load-on-demand dynamic libraries. The "general-purpose" library processes arbitrary number of NICs. There are also versions with hard coded parameters optimized for 1(HD mode) and 2(FD mode) NICs. The programming API may resemble PCAP (full compatibility may be impractical because of functional differences). The general-purpose library may accept interface initialization strings with multiple interfaces (e.g., "eth1:eth3:eth5").

Measurements of real traffic and simulated traffic with a TCP-oriented model for distribution of packet arrival times demonstrated that improvements to packet buffering and pick-up increase time slot for packet processing by 20% on average. On the same traffic this leads to 30%-50% decrease in packet loss ratio ("PLR") in the 0.5-1 Gbps zone, allowing the sensor to handle 1.5 times or more load given the same PLR cut-off and traffic saturation levels.

Figure 2:
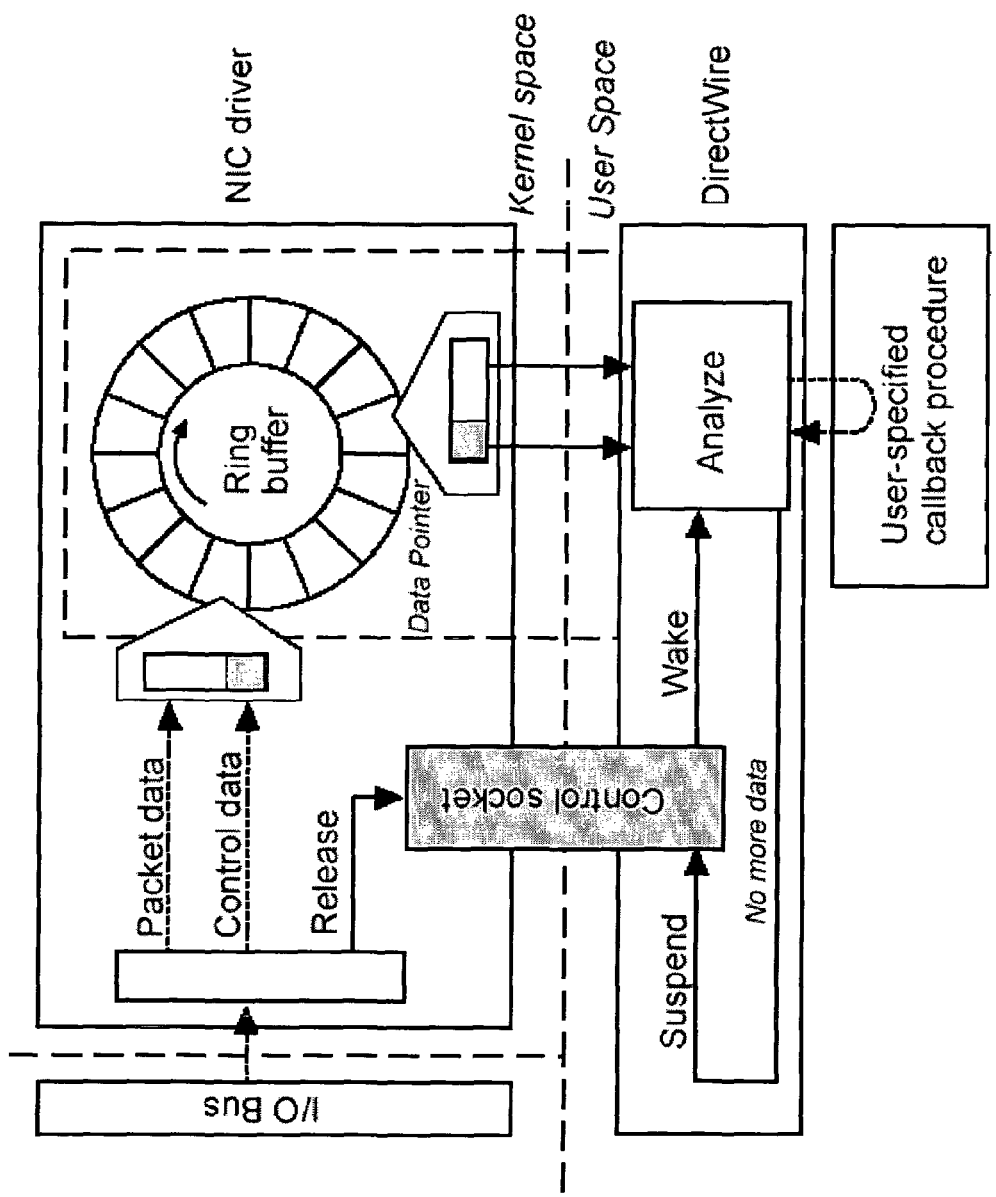
FIG. 2 depicts a block diagram of one embodiment of a packet capture of FIG. 1.

The packet capture module (see, for example, FIG. 2) may be configured to utilize the Linux high-speed network-capturing interface. This interface may allocate a ring buffer within the NIC driver space and map it directly to the recipient's process, eliminating the overhead of system calls to copy the data from the kernel to the destination process. Additional advantage of the ring buffer may be that it effectively smoothes out surges in the network traffic and delays in packet processing.

The packet capture module may be implemented using C language in a form of a load-on-demand dynamic library. There may be three libraries, optimized for use with 1 NIC, 2 NICs and arbitrary amount of NICs.

Packet Capture Module API

The packet capture module may be implemented using standard UNIX dynamic library interface. It may be used in the packet capture module as a load-on-demand dynamic library. There are several packet capture module libraries, optimized for different number of NICs (e.g., 1, 2, user-specified). The packet capture module API may be the same for all instances, except, for example, for initialization call that expects specially-formatted string containing specific number of NIC names.

The packet capture module may export the following functions:

void*init(char*iface, char*errbuf, char*nr_blocks)

iface: NIC name string, like "eth1". In the case of multiple interfaces, iface string looks as follows: "eth1:eth3:eth2"

errbuf: pointer to the caller-provided error buffer, for example, not less than 512 bytes nr_blocks: requested amount of blocks to be allocated by the NIC driver. If nr_blocks is 0, default value is requested.

void fini(void*handler)

handler: value returned by the corresponding init( ) function void stat(void*handler, pc_st*stat)

handler: value returned by the corresponding init( ) function stat: statistics data structure int linktype(void*handler)

handler: value returned by the corresponding init( ) function int loop(void*handler, pc_catcher_t*func, char *arg)

handler: value returned by the corresponding init( ) function func: the address to the user-specified function that accepts the packet data arg: optional arguments to be passed down to the func( )

Packet Capture Module Initialization

A method may load the packet capture dynamic library and call its init( ) function. This function may parse the input string for NIC names and for each NIC name found may perform the following:

Create a packet socket;

Request a NIC driver to allocate a ring buffer with a size specified;

Map the resulting buffer to its memory space; and/or

Initialize internal buffer markers that point at the beginning of the buffer segments.

Figure 3:
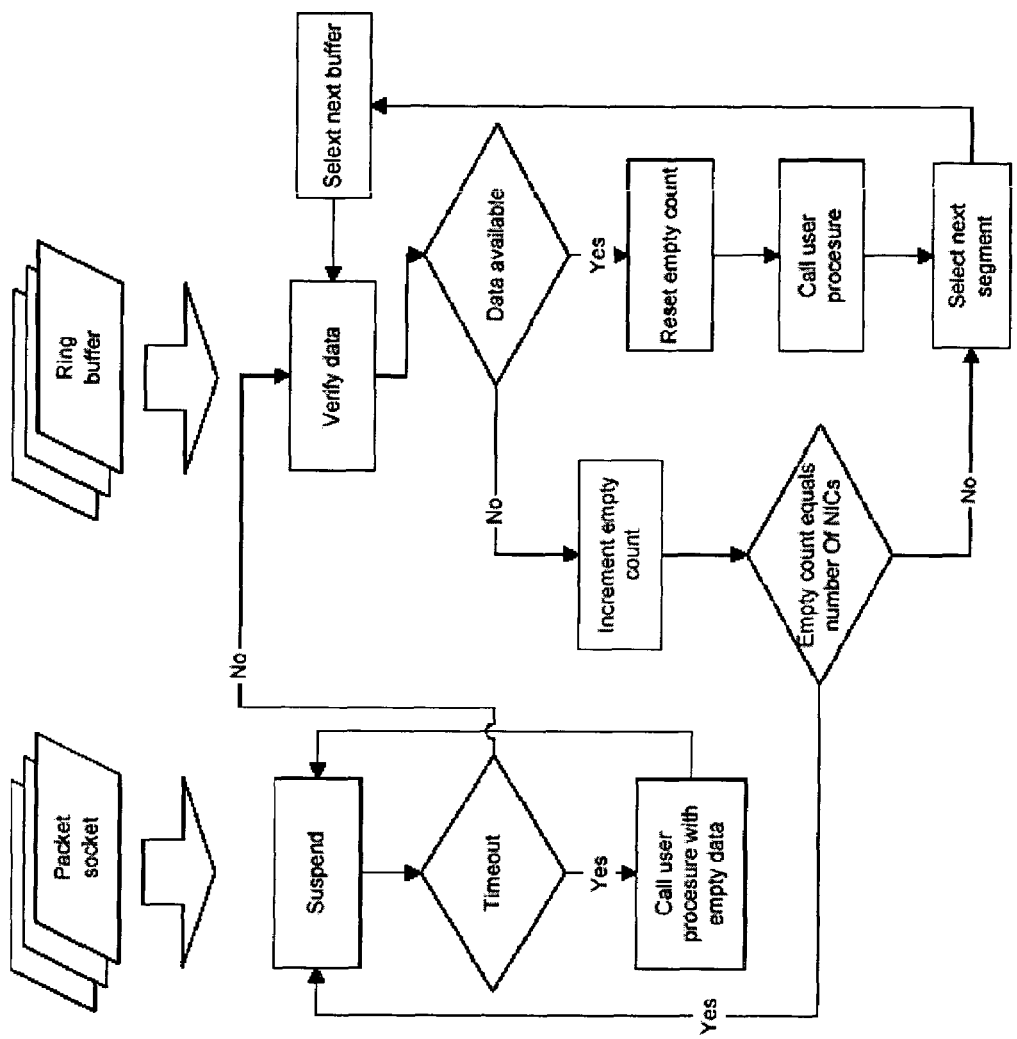
FIG. 3 depicts a flow diagram of one embodiment of a packet capture of FIG. 1.

After initialization the method (see, for example, FIG. 3) may call loop( ) function. loop( ) function may work during the method lifetime, for example, until a fatal error occurs or the method receives the termination signal. loop( ) may poll NIC buffers in round-robin manner. Current segment of each buffer may be verified for data readiness by checking the control field initialized by the driver (see, for example, FIG. 2). If no data is available in the segment, the next NIC buffer may be checked. If all the buffers are empty, loop( ) may suspend the method, for example, using a poll( ) system call.

The method may be resumed when new data becomes available or after a timeout (e.g., one-second timeout), whichever comes first. In the case of timeout, the user-specified function may be called with NULL argument. This is useful for certain packet processors whose task is to watch for an absence of the traffic. After the user function is called, the method may be suspended again via poll( ). In the case of available data, the method may check the result returned by poll( ) to see which NIC buffer currently has the data and may jump directly to that buffer's last-checked segment, resuming the normal buffer polling procedure afterwards. If poll( ) signaled about more than one ready buffer, the method may resume the normal procedure from the saved buffer index.

The packet capture module may stop when the method finds a reason to exit. The fini( ) function from the packet capture API may close the control sockets. UNIX standard process exit procedure may close all communication channels and reclaim all the memory used by the method. Accordingly, there may be no need to call fini( ).

IP Defragmenter

One embodiment of an IP defragmenter(see, for example, FIG. 1) may be configured to satisfy specific requirements for a network sniffer. Multi-purpose IP defragmenters have been designed under the assumption that the traffic is legal and fragmentation is rare. A network sniffer serving as a base for packet inspection application may have to work under heavy loads and be stable in the presence of DoS attacks. In addition to providing fast and/or robust packet reassembly, it may detect and react to illegal fragments, for example, as soon as they arrive. The packet inspection application may then include low reaction latency and may withstand attacks specially designed to bring down 'standard' IP stacks. The IP Defragmenter for network sniffer may provide the following configurable options: minimum fragment size, maximum number of fragments per packet, maximum reassembled packet size, packet reassembly timeout, etc. The EP Defragmenter may be configured to perform equally well on any fragment order.

The defragmenter may include a low per-fragment overhead, and may focus on per-fragment (and/or on per-packet overhead) to handle DoS attacks flooding the network with illegal and/or randomly overlapping fragments. Minimization of per-fragment overhead may be achieved by lowering the cost of initialization/finalization phases and/or distributing the processing (e.g., evenly) between the fragments. As a result, invalid fragment streams may be recognized early in the process and almost no time may be spent on all the fragments following the first invalid one. Minimizing initialization/finalization time may also positively effect the defragmenter's performance on very short fragments, used in some DoS attacks targeted at security devices. This improvement may be attributed to better utilization of buffering capabilities provided by NIC and a packet capture library.

The defragmenter's may provide a throughput, for example, above 1 Gbps, and may reach, for example, 19 Gbps on large invalid fragments. On invalid fragments, the defragmenter's early invalid fragment detection may lead to 6-fold performance gains. IP fragment order may have no impact on the IP Defragmenter performance.

For comparison, Snort v2.0's defragmenter, for example, scores 3 times slower on average than the IP Defragmenter performance. Low throughput on small fragments and/or invalid fragments is a bottleneck that may affect the ability of the whole packet inspection application to handle heavy loads and withstand DoS attacks on Gigabit networks.

Figure 4:
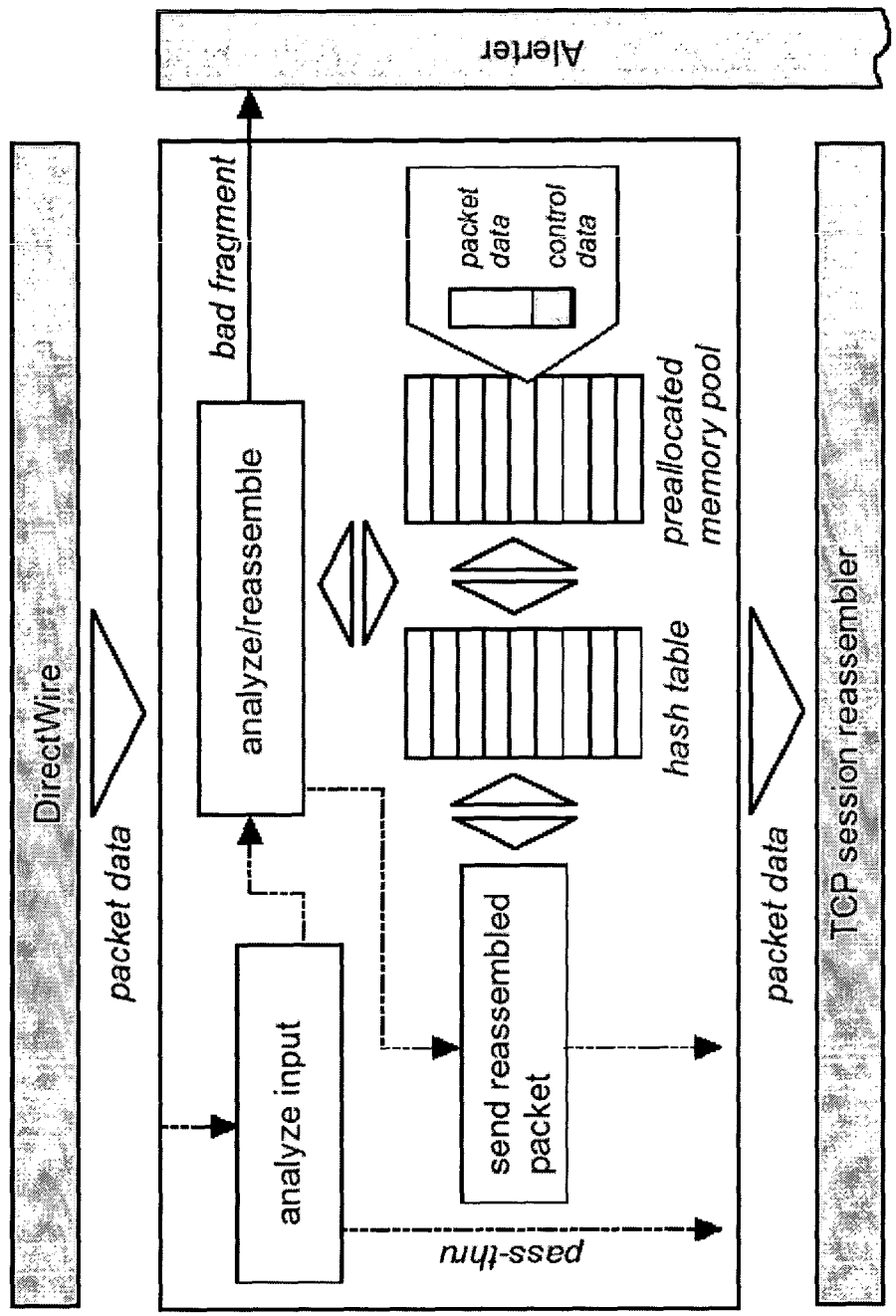
FIG. 4 depicts a block diagram of one embodiment of an IP defragmenter of FIG. 1.

One embodiment of the IP defragmenter (see, for example, FIG. 4) may be configured to be an accurate and high-speed IP packet defragmenter. A subroutine of the IP defragmenter may be called once per each network packet coming from the packet capture module. The subroutine may check the packet for IP fragment attributes. If attributes are found, the packet may be considered a fragment and may be sent to fragment processing/reassembling subroutines. The fragment may also be sent to the next processor module--packet processors like SNORTRAN may need to scan all packets received, including fragments. After successful reassembly, the reassembled IP packet may be submitted for further processing. IP fragments that are deemed bad and/or do not satisfy separately configured requirements may be reported, for example, using an alerting facility. The IP Defragmenter may also use a statistics memory pool to count fragments received, packets defragmented, alerts generated, etc.

IP Defragmenter Configuration Parameters

The IP defragmenter may accept the following configuration parameters:

mempool: sets the size of the memory pool and corresponding hash table size. Values may be small, medium, large, huge.

maxsize: sets the maximum size for 'legal' reassembled IP packet. The IP defragmenter may generate an alert and dismiss the packet if reassembled length will be larger than specified value. Default value may be 10 KB.

minsize: sets the minimum size for 'legal' reassembled IP packet. The IP defragmenter may generate an alert and dismiss the packet if reassembled length will be smaller than specified value. Default value may be 1000 bytes. and/or timeout: sets the timeout for IP packet reassembly. The IP defragmenter may generate an alert and dismiss the packet if reassembly time for this particular packet will go beyond specified value. Default value may be 30 seconds.

IP Defragmenter Initialization Procedure

The IP Defragmenter's initialization subroutine, ipdefrag_init( ), may be called during startup. The subroutine may read the configuration file and allocate a pool of defragmenter session descriptors together with the corresponding hash table (sizes may be set in the configuration file). The IP defragmenter may not allocate memory dynamically during the packet-processing phase: all requested resources may be pre-allocated during the initialization stage. To improve performance, allocated memory may be excluded from swapping, for example, by using Linux mlock( ) system call. After calling mlock( ), the allocated memory may be initialized using bzero( ) call, ensuring that all necessary pages are loaded into memory and locked there, therefore no page faults may occur during packet processing phase. ipdefrag_init( ) may be called under supervisor privileges to ensure that mlock( ) call succeeds.

Figure 5:
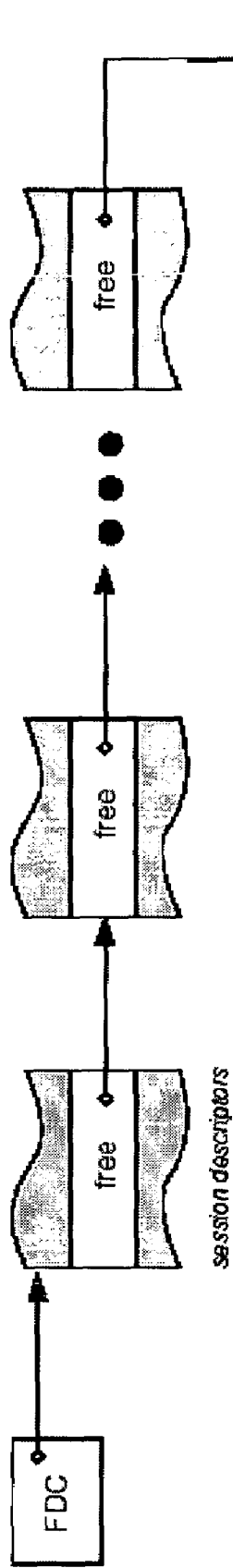
FIG. 5 depicts one embodiment of an IP defragmenter free descriptor chain.

After allocation, all session descriptors from the pool may be sequentially inserted into one way free descriptor chain (see, for example, FIG. 5). This chain may be used by allocation and de-allocation subroutines during packet processing phase.

Figure 8:
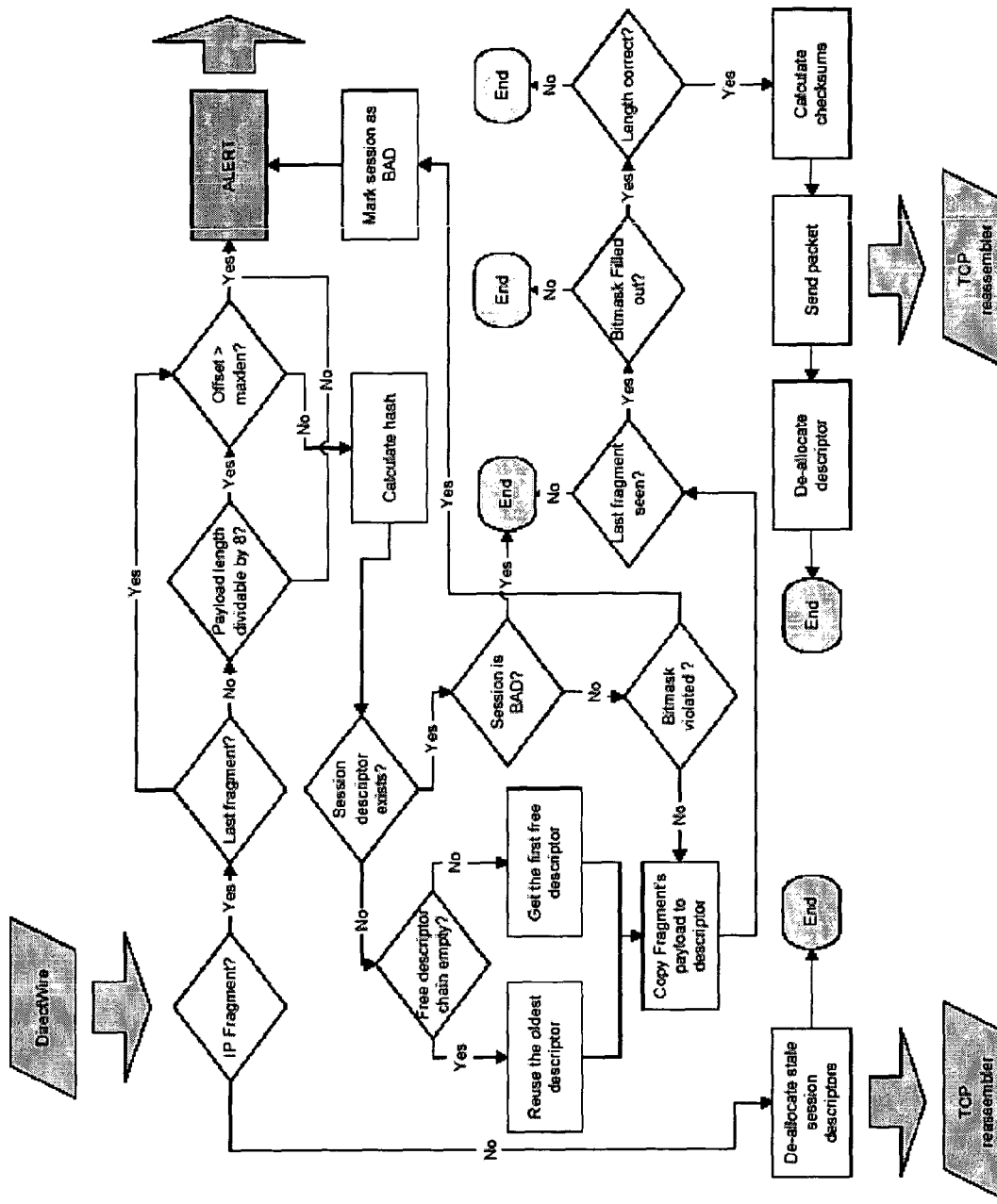
FIG. 8 depicts a flow diagram of one embodiment of an IP defragmenter of FIG. 1.

One embodiment of the IP defragmenter's packet processing (see, for example, FIG. 8) may include an entry point, ip_defrag( ), that may be called every time new packet data is coming from the packet capture module. ip_defrag( ) may check that the packet has IP fragment attributes, for example, either MF flag and/or fragment offset is not zero. If the packet is recognized as an IP fragment, its length may be verified: all IP fragments except the last one may have a payload length divisible by 8. An alert may be generated for fragments of incorrect length; after that, such fragments may be ignored.

If the incoming packet has not been recognized as an IP fragment, ip_defrag( ) may check the oldest elements in the descriptor age chain (see, for example, FIG. 6) for the elements that timed out and de-allocates them if found. The de-allocation subroutine may reset the defragmenter session descriptor, remove it from the hash table and descriptor age chain (see, for example, FIG. 6) and put it to the beginning of the free descriptor chain (see, for example, FIG. 5), adjusting free descriptor chain ("FDC") variable.

Otherwise, fragment's IP id and its protocol, source and destination addresses may be used to calculate a hash value to access the session descriptor for incoming fragment. If no session descriptor is found for the fragment, the new one is allocated. Allocation subroutine may take the descriptor from the head of the free descriptor chain referred to by FDC variable (see FIG. 5); then switches FDC to the next descriptor in chain. The reference to the newly allocated descriptor may be inserted into two places:

Hash table using calculated hash value; and/or

Figure 6:
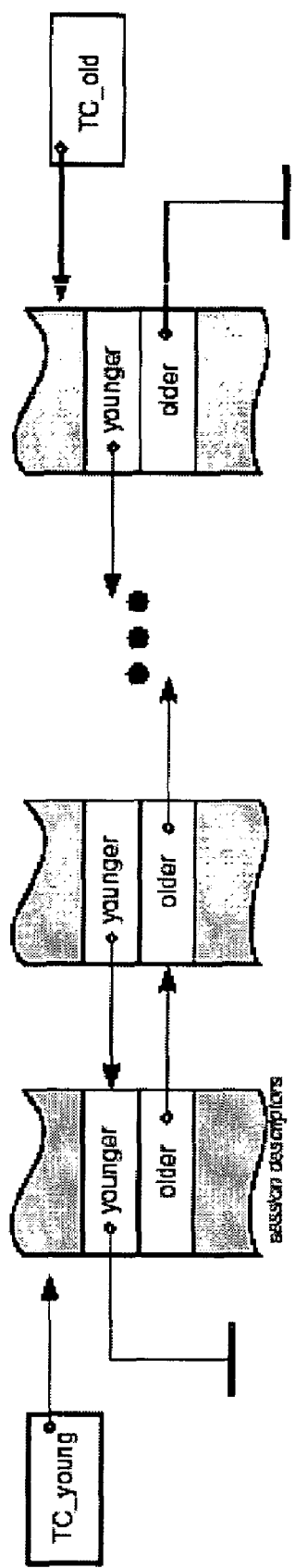
FIG. 6 depicts one embodiment of an IP defragmenter descriptor age chain.

Two-way descriptor age chain, as the 'youngest' entry, adjusting variable TC_young (see FIG. 6).

If the free descriptor chain is empty, an allocation fault counter from the statistics shared pool may be incremented and the oldest descriptor from descriptor age chain may be reused. This may ensures that:

the method can handle a resource shortage without crash; and/or

New IP packets may have higher priority than the old ones. In modem networks, 30-second IP reassembly timeout is seldom and usually indicates maliciouis activity.

Figure 7:
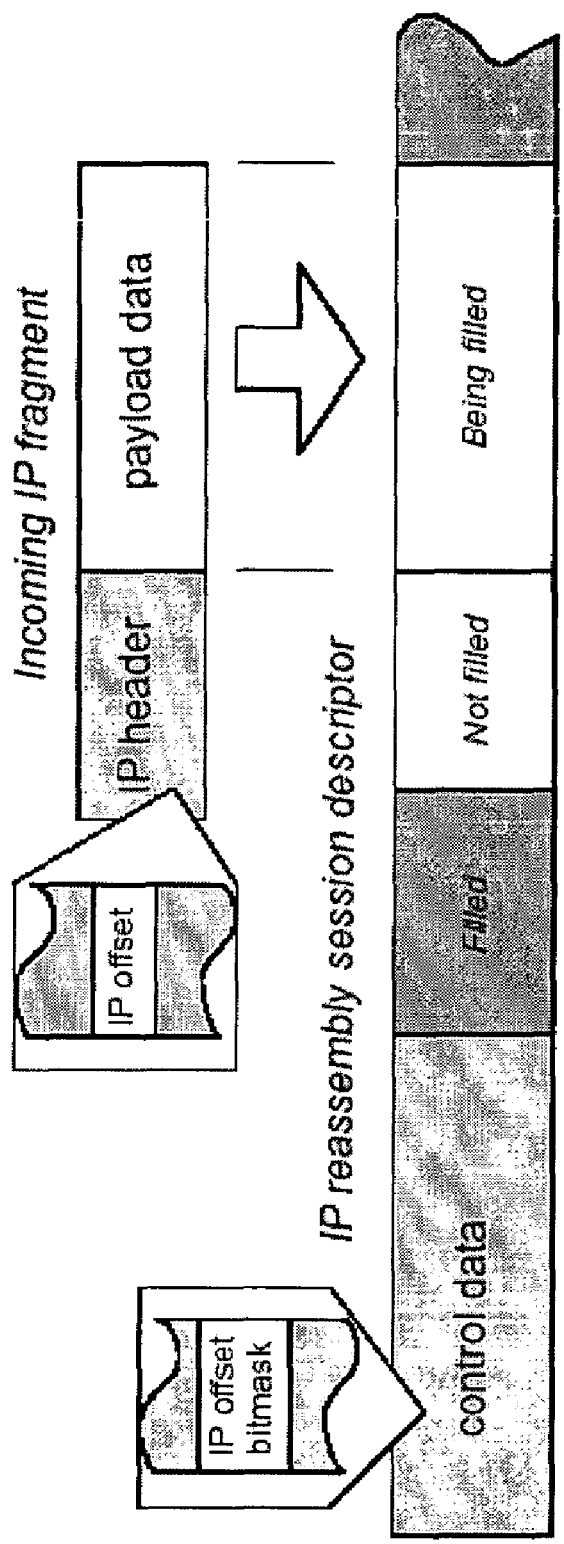
FIG. 7 depicts one embodiment of an IP defragmenter session descriptor structure.

A defragmenter session descriptor (see, for example, FIG. 7) may include two parts: the control data and the payload buffer. Payload data from the incoming IP fragment may be copied into the payload buffer of the corresponding session descriptor. Flags in the IP offset bitmask in the descriptor may be set to identify precisely which 8-byte chunks of reassembled IP packet are copied.

Any new IP fragment carrying chunks that are already marked may cause an alert. The corresponding defragmenter descriptor may be marked as bad. Each subsequent fragment belonging to the bad descriptor may be ignored. As previously described, the bad descriptor may be deallocated even tually (e.g., when its timeout expires). This approach may allow that:

Malicious IP fragments (teardrop attack, etc) may be identified even after the alert is sent;

Only one alert may be generated per each malicious session; and/or

Malicious IP fragments may not create a resource shortage in the Free descriptor chain.

The reassembled IP packet referred to by a defragmenter session descriptor may be considered complete if:

All fragments are copied (e.g., no gaps in IP offset bitmask);

Last IP fragment is received; and/or

The resulting length of the reassembled payload is equal to the sum all payload fragments from the corresponding session.

The reassembled packet may receive new IP and Layer 4 checksums if necessary. Thereafter, it may be sent for further processing to the rest of the pipeline.

When packet delivery is completed, the corresponding defragmenter session descriptor may be de-allocated as described before.

TCP Reassembler

One embodiment of a TCP reassembler (see, for example, FIG. 1) may be capable of multi-Gigabit data processing. It may feed reassembled network data to modules such as, for example, content scanning and encryption detection. It may also assign TCP stream attributes to each network packet processed, for example, making it possible to analyze the packet by deep packet inspection modules.

The TCP reassembler may track TCP sessions, keep a list of information describing each open session and/or concatenate packets belonging to a session so that the entire content of the client and server streams may be passed to upper levels of content inspection. The TCP reassembler may provide multi-layer reassembly and content inspection. Partial solutions like "deep" packet inspection, handling of only one side of a full-duplex connection, and/or reassembling arbitrary regions within the data stream to improve the chances of probabilistic detectors may not be adequate.

The TCP reassembler may be sophisticated enough to handle the intricacies of real-life packet streams. The problems faced by packet inspector's reassembler may be quite different from those of TCP/IP stacks: packets seen by sniffer NIC in promiscuous mode do not come in expected order, so traditional state diagrams may be of little use; standard timeouts may need to be adjusted due to various delays introduced by taps and routers; there may not be enough information in the packet stream to calculate internal states of the client and server, etc.

TCP stream reassembler for a packet sniffer may operate in a harsh environment of the modern network, for example, better than any 'standard' TCP/IP stack. The TCP reassembler may include TCP SYN flood protection, memory overload protection, etc. The TCP/IP stream reassembler for a packet sniffer may be fast.

The TCP reassembler may be coupled to the packet capture layer, allowing it to watch any number of NICs simultaneously and/or interleaving data taken from different network streams. The packet capture layer may allow reliable reassembly of both client and server data, for example, in Full-Duplex TCP stream and/or asymmetrically routed packets, where each stream may depend on the other for session control information.

The TCP reassembler may operate in one or more modes:

Session tracking only. This mode may suite applications that only need to track TCP packet's direction (e.g., client to server, or vice versa) and validity. In SMP setting, direction information may be made available to recipient applications via a packet-level API.

Session tracking and Partial TCP stream reassembly. The initial parts of client-server conversations may be collected in buffers limited by a configurable cutoff value. In SMP setting, the reassembled stream may be made available to recipient applications via a stream-level API. This mode may be configured for application logging initial segments of TCP sessions containing malicious packets. The default cutoff value may be 8 KB for a server part of the conversation and 8 KB for the client part. and/or Session tracking and Advanced TCP Stream reassembly. Client-server conversation may be collected into pre-allocated buffer chains. By default, up to 1600 KB of every conversation may be collected (e.g., 800 KB per direction). The size parameter may be configurable and may be increased as needed. Reassembled streams may be made available to recipient applications in SMP setting. 'TCP Sequence skip' effects usual for long TCP sessions may be watched and distinguished from malicious and/or out-of-window packets. This mode may deliver stream reassembly, for example, for an application where the reassembled stream is further decomposed/decoded layer-by-layer and analyzed for content.

The TCP reassembler may be based on simplified state transition diagrams reminiscent of Markov Networks. Each socket pair may be mapped to a separate finite state automaton that tracks the conversation by switching from state to state based on the type of the incoming packet, its sequence number, and its timing relative to the most recent "base point" (e.g., the previous packet or the packet corresponding to a key transition). Since the reassembler may have to deal with out-of-place packets (e.g., request packet coming after the reply packet), transitions may not rely exclusively on packet type. At each state, the automaton may keep several "guesses" at what the real state of conversation might be, and may choose the "best" one on the basis of the incoming packet. Whichever "guess" may better predict the appearance of the packet may be taken as the "best" characterization of the observed state of the conversation and new "guesses" may be formed for the next act.

The TCP reassembler may also include planning and transitions that are hard-coded; parameters that are fixed and inline-substituted that allow for code optimization. The resulting reassembler may include an average throughput of 1.5-2 Gbps (or more or less) on normal traffic. It may go down to 250 Mbps on specially prepared SYN flood/DoS attacks, when the average packet length may be 80 bytes.

The TCP reassembler may be fast enough to deal with fully saturated 1 Gbps traffic. Combined with a separate packet-level inspection process running on a second CPU in SMP configuration or one or more separate TCP Stream decoders/analyzers, the platform may provide the basis for a wide range of Gigabit-capable network monitoring solutions. In comparison, presently available open-source solutions like Snort's stream4 require cheats and tricks to keep up with Gigabit traffic on commodity hardware. In Snort2, this means restricted default settings (client only, several well-known ports) and artificial filters such as 'HTTP flow control' processor, ignoring as much as 80% of the traffic in default mode. Experiments with Snort2 settings make clear that stream4's throughput is a real bottleneck; allowing more packets in just changes the way Snort drops packets from 'predictable' to 'random'.

Figure 9:
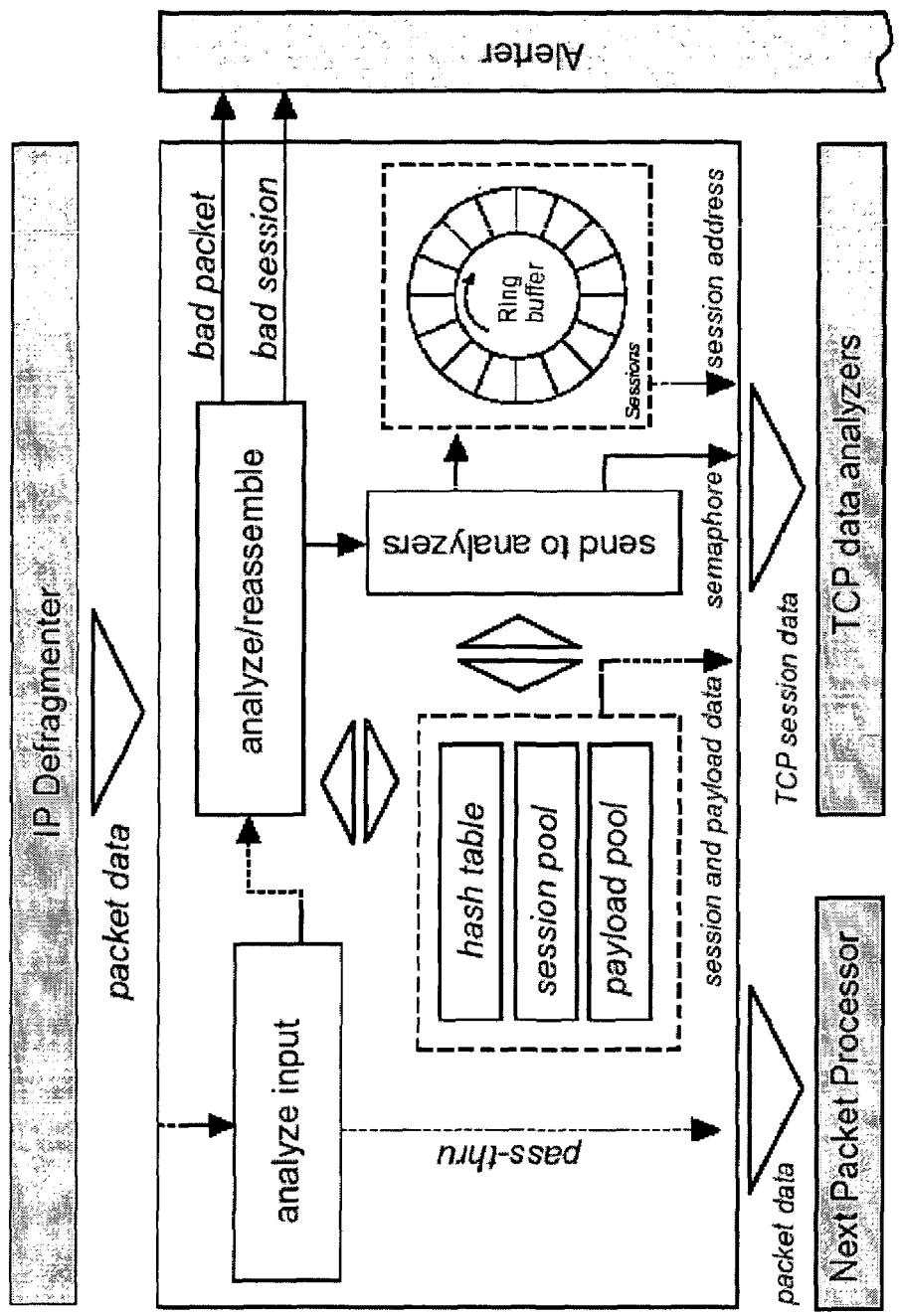
FIG. 9 depicts a block diagram of one embodiment of a TCP reassembler of FIG. 1.

A subroutine of the TCP Reassembler module (see, for example, FIG. 9) may be called once per each network packet coming from the IP defragmenter. The routine may verify that the packet is a TCP packet. If it is, the packet may be sent for TCP processing/reassembling. The packet may be annotated by the address of the TCP session it belongs to (if any) and may be submitted to the pipeline for further processing (depending on configuration).

Packets and corresponding sessions may be checked for illegal TCP flag combinations (requirements for what is legal may be configured separately). Illegal packets and sessions may be reported, through an alerting facility, and/or discarded, depending on configuration. The TCP Reassembler may reconstruct TCP sessions together with client-server conversation data and may send them for further processing to analysis modules, for example, using UNIX IPC-shared memory and semaphore pool. The analysis modules may run as separate UNIX processes. They may use IPC channels to retrieve the TCP session data. TCP Reassembler may also use a statistics memory pool to count reassembled sessions, generated alerts, etc.

TCP Reassembler Configuration Parameters

The TCP Reassembler may accept the following configuration parameters:
  alert: generate alerts on illegal packets and TCP sessions.
  evasion_alert: generate alerts if a TCP packet does not fit into predicted TCP window.
  noclient: do not reassemble client's part of the conversation (socket pair).
  noserver: do not reassemble server's part of the conversation.
  plimit: sets the maximum amount of memory buffers used to reassemble a particular client-server conversation.
  pring: sets the size of payload ring used to send the reassembled data to analyzers.
  mempool: sets the size of the memory pool used for TCP session descriptors and the corresponding hash table size. Values may be: small, medium, large, huge. and/or
  payload: sets the total amount of memory buffers used to reassemble client server conversations and their total size. Per-session limit may be set by the plimit parameter.

TCP Reassembler Initialization

An initialization subroutine, tcps_init( ), of the TCP Reassembler may be called during startup. The subroutine may read the configuration file and use UNIX shared memory to allocate the following memory pools:
  TCP session descriptors;
  Hash table for accessing the session descriptor pool;
  Payload buffers; and/or
  TCP session ring buffer.

Memory allocation sizes may be calculated based on configuration parameters. UNIX semaphore set of size 32 may also be allocated.

The TCP Reassembler may not allocate memory dynamically during the packet-processing phase; all requested resources may be pre-allocated during the initialization stage. Allocated shared memory may be excluded from swapping by using Linux SHM_LOCK option in shmctl( ) system call. After requesting the lock, the allocated memory may be initialized using bzero( ) call, ensuring that all necessary pages may be loaded into memory and locked there, therefore no page faults may occur during packet processing phase. tcp_stream_init( ) may be called under supervisor privileges to ensure that shmctl( ) call may succeed.

If the necessary segments are allocated already, and all sizes are correct, tcp_stream_init( ) may attach to existing memory pools without resetting them. In addition, the module may not de-allocate memory if restarted. This may be done to support the 'soft restart' feature: reloaded application may continue to use existing TCP session data, losing packets just for the moment of reload.

The TCP Reassembler may require memory (e.g., vast amounts of RAM). In order to get all the requested memory, the application may utilize sysctl( ) to increase SHMMAX system parameter during standard startup procedure.

Figure 10:
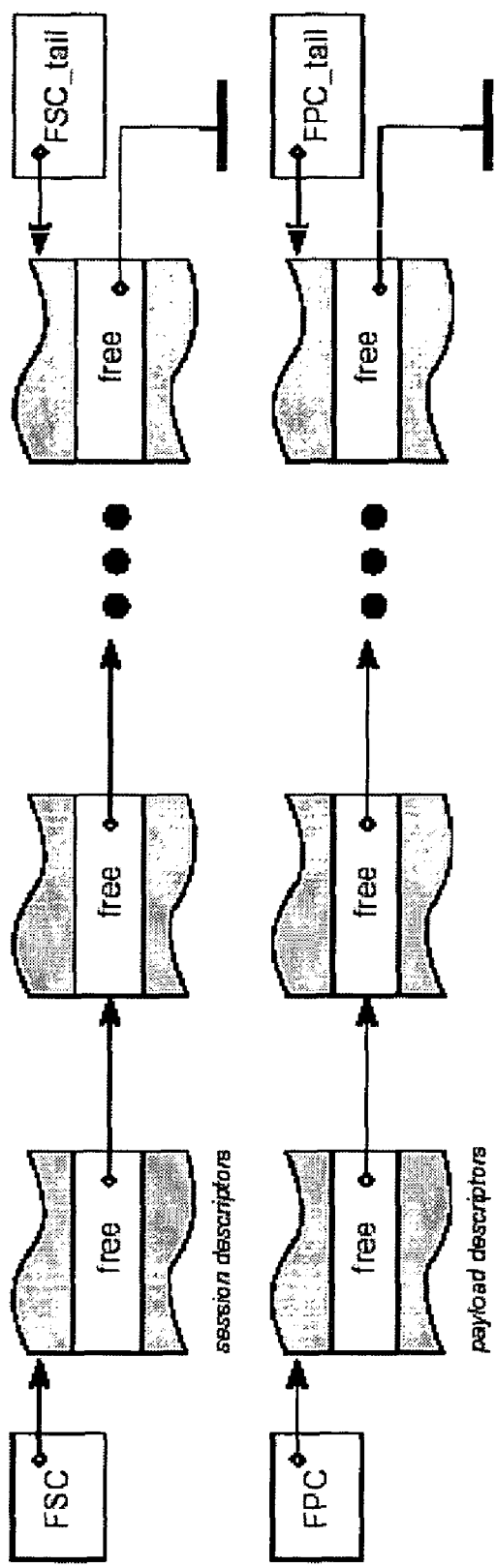
FIG. 10 depicts one embodiment of a TCP reassembler free session and payload chains.

After allocation, TCP session descriptors and payload buffers may be sequentially inserted into the free session chain and the free payload chain, respectively (see, for example, FIG. 10). These chains may be used by allocation and de-allocation subroutines during the packet processing phase.

TCP Session Allocation and Status Transition

Figure 11:
FIG. 11 depicts one embodiment of a stream transition diagram.

To mirror the full-duplex nature of a TCP session, the descriptor may contain two identical substructures that describe client and server streams. The states recognized for each stream may include LISTEN, SYN_RCVD, SYN_SENT, ESTABLISHED and CLOSED. The life cycles of both streams may start in CLOSED state. For normal TCP/IP traffic, the states may be upgraded to ESTABLISHED and then, eventually, back to CLOSED, in accordance with the Stream Transition Diagram (see, for example, FIG. 11).

Stream's descriptor field ISN may be used to save SEQ numbers when SYN and SYN_ACK packets are received. This field may be later used for TCP payload reassembly and additional TCP session verification.

The TCP session descriptor may follow its stream's transitions with its own state flag, reflecting the general status of the session: UNESTABLISHED, ESTABLISHED or CLOSED.

Figure 12:
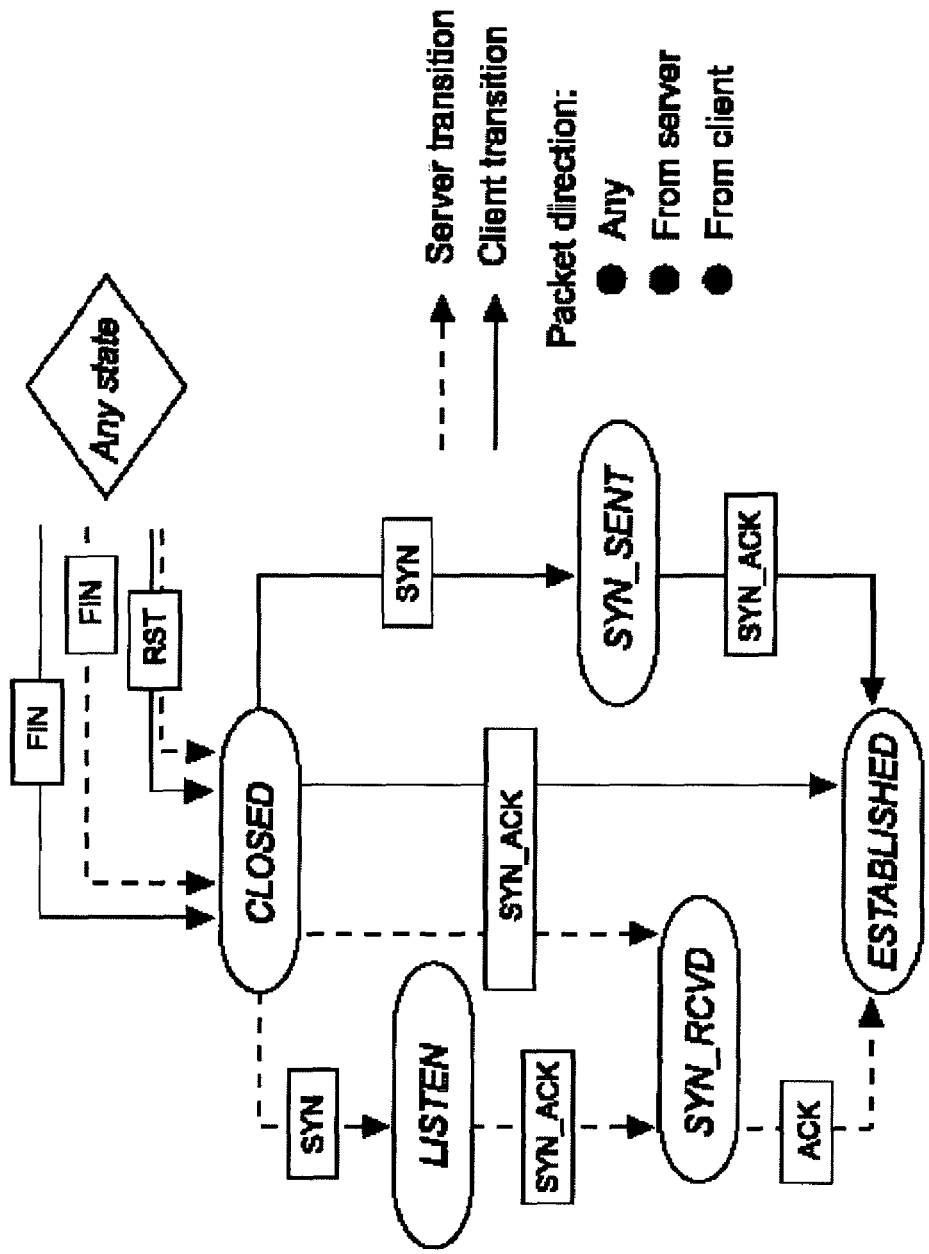
FIG. 12 depicts one embodiment of a TCP session transition diagram.

FIG. 12 illustrates one embodiment of a session state transition diagram. Each session may start in the UNESTABLISHED state. It may get upgraded to ESTABLISHED state when both client and server streams are switched to ESTABLISHED state. The session may be CLOSED when both streams are switched to CLOSED state.

Figure 13:
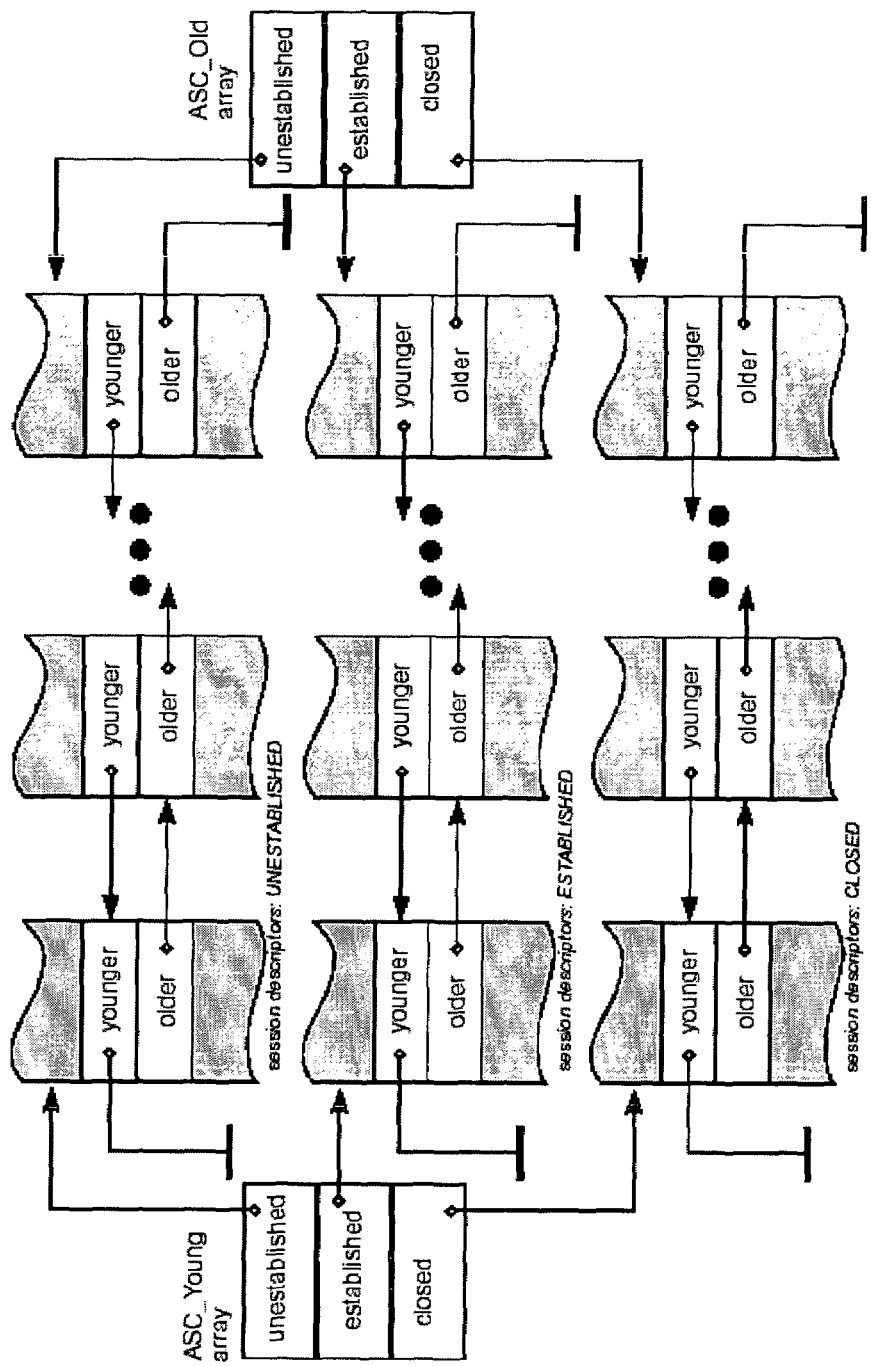
FIG. 13 depicts one embodiment of a TCP session age chain.

Each session state may correspond to a particular place in the session age chain (see, for example, FIG. 13). The session allocation subroutine may perform the following acts:
  the descriptor is initialized by calling bzero( );
  the descriptor is placed to the hash table;
  the descriptor is removed from the free session chain;
  the descriptor is placed to the head of the UNESTABLISHED age chain; and/or
  an unique session id is assigned to a descriptor's sid field.

With every session upgrade, the descriptor may be removed from the current age chain and placed to the head of the next one, in accordance with session state transition diagram.

TCP Session De-allocation

The TCP session descriptor may include a field called etime that keeps the time of the most recent packet belonging to this particular session. With every packet received by the TCP Reassembler, the sessions at the end of the age chains may be tested for timeout, for example, by a ses_recycle( ) subroutine. The timeout used may depend on the session's state:
  UNESTABLISHED: 12 sec
  ESTABLISHED: 600 sec
  CLOSED: 30 sec The ses_recycle( ) procedure may also look at a module-wide RC_LVL variable that determines the maximum number of stale sessions to de-allocate per received packet. This number may start from two stale sessions per packet and ends up, for example, as high as 30 sessions per packet (there is a table to calculate number of sessions based on RC_LVL value, where the RC_LVL itself may range from 1 to 7). The ses_recycle( ) procedure calculates the limit, decrements RC_LVL if necessary (minimum value may be 1), then approaches the Session age chain from ASC_old side (see, for example, FIG. 13) in the following order: UNESTABLISHED to CLOSED to ESTABLISHED. In each chain it may de-allocate stale sessions from the end, then it may move to the next chain in sequence if necessary, until no more stale sessions left or the limit is reached.

RC_LVL may be increased each time there is a conflict during insertion of the new session into the hash table. It may also be assigned to the maximum value when the reassembler is in a TCP Reassembler Overload Condition mode.

The de-allocation subroutine may remove a session descriptor from the hash table and the session age chains and transfer it to the end of the free session chain, for example, using the FSC_tail variable. No session data may be reset during the de-allocation procedure; this way the data still may be used by asynchronous modules until it is reset during a subsequent allocation.

If a session has its payload data collected, the subroutine may insert the session's address and session id into the TCP Session ring buffer and reset the semaphore array, indicating that the session data is available for asynchronous processing. The asynchronous processing module may compare the provided session id with the one assigned to the sid field to verify that the data is not overwritten yet and commence processing.

TCP Session information may also be inserted into the TCP Session ring buffer if the session is upgraded to the CLOSED state. After submission, payload buffers may be detached from the session. The freed field in the session descriptor may prevent the TCP Reassembler from submitting the data twice.

Handling TCP Reassembler Overload Condition

One embodiment of a TCP Reassembler Overload Condition may arise when there are no free session descriptors available to satisfy the allocation request. It can happen if the mempool configuration parameter is inadequate for the network traffic, or when the network segment is under TCP syn-flood attack. When switched to this mode, the TCP Reassembler may set the RC_LVL variable to its maximum value and cease allocation of new sessions until the free session amount becomes, for example, less than 10% of the total session pool. It may continue tracking existing sessions and collecting their payload data.

TCP Session Queue API

Figure 14:
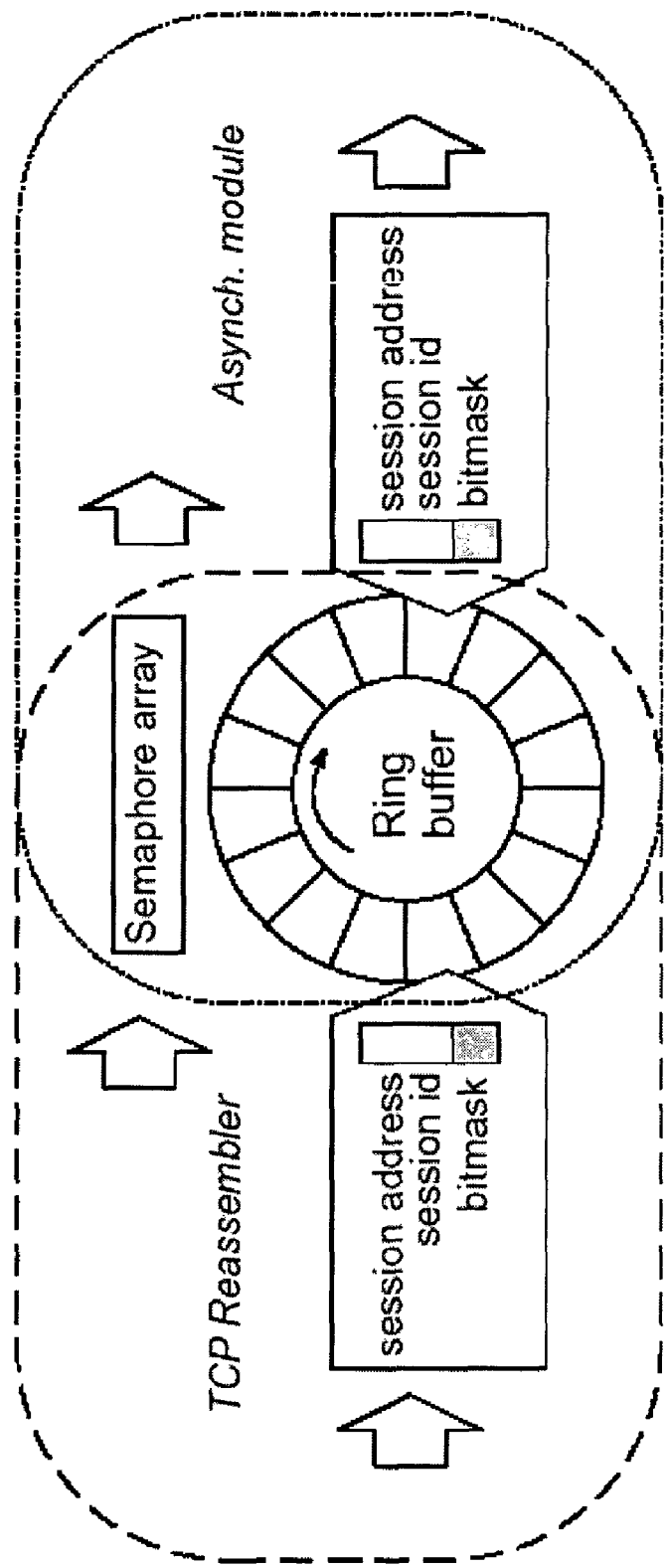
FIG. 14 depicts one embodiment of a TCP session ring buffer.

A TCP Session Ring Buffer and a semaphore array may be allocated during TCP Reassembler initialization phase, for example, using the UNIX IPC facility. The buffer may be accessible to any process having permission. FIG. 14 illustrates each buffer sector including the TCP Session address, session id and an integer value that is treated as a bitmask (e.g., 32 bits). The semaphore array may contain 32 semaphores.

Each asynchronous processing module may call a tcpplcl_init( ) subroutine specifying a unique id number between 0 and 31 in order to attach to the Ring Buffer and the semaphore array. The id provided may be used by other API functions to refer to the particular semaphore in the semaphore array and the corresponding bit in the bitmask. The process may then call tcpplcl_next( ) to get the next available TCP session.

TCP Reassembler may submit a new session for processing by performing the following acts:
  puts the session address and session id into the next sector of the ring buffer;
  resets the bitmask in this sector; and/or
  resets the semaphore array.

The tcpplcl_next( ) subroutine on the client side may wait for the id-specific semaphore, for example, using semwait( ) call. When the buffer is ready, it may walk through the buffer segment by segment, setting the id-specific bit in the bitmask until it finds that the bit in the next sector is already set. This condition may mean that no more data is available yet—it is time to call semwait( ) again. The API may supply the application with full information on TCP session and the reassembled payload data. As soon as it becomes available, the information may be processed.

TCP Payload Reassembly

Each time the session descriptor is switched to the ESTABLISHED state, payload buffers may be taken from the Free payload chain, initialized and assigned to client and/or server stream descriptors, if permitted by noclient and noserver configuration parameters.

Figure 15:
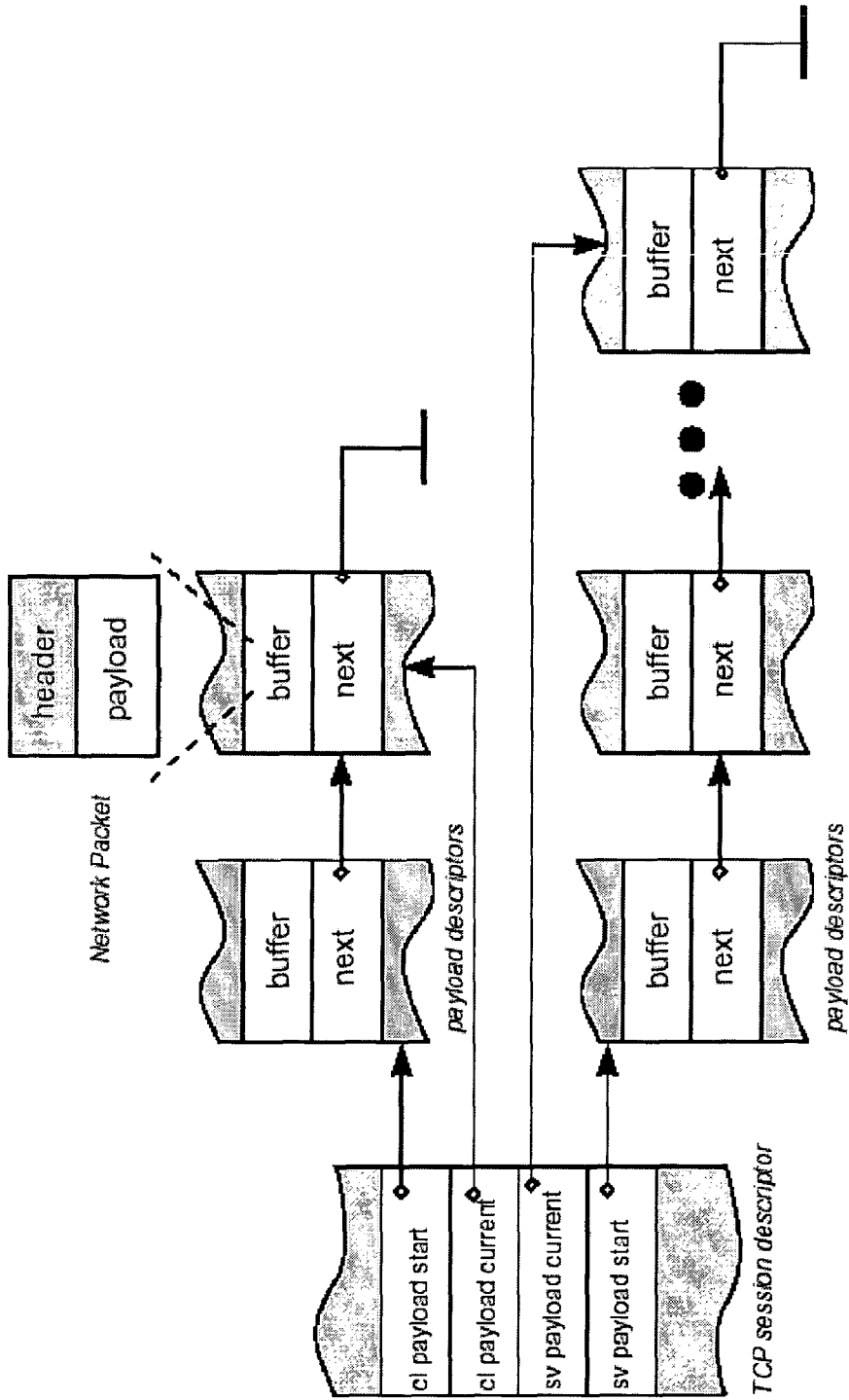
FIG. 15 depicts one embodiment of a TCP payload chain.

Each nonempty payload of a packet belonging to a particular session may be copied to the corresponding place in the Payload buffer, until the session is upgraded to the CLOSED state or number of payload buffers exceeds the limit, for example, as specified by the plimit parameter (see, for example, FIG. 15). The position of packet's payload within the buffer may be determined by combination of the packet's SEQ number, stream's ISN and the value of stream's base field. The latter may be calculated by a subroutine: modem TCP stacks tend to randomly increase SEQ number for long TCP sessions; base field compensates for those changes.

A pl_alloc( ) subroutine may be used to add Payload buffers to the chain, for example, up to plimit value. In case of empty Free payload chain, pl_alloc( ) may do the following:
  increments the payload fault counter in the statistics pool;
  marks the current payload chain as completed, avoiding out-of-bound payload copying later; and/or
  returns the error to the caller.

When the session reaches the CLOSED state, or if Payload buffers are de-allocated from ESTABLISHED state due to session timeout, a ses_free( ) subroutine may do the following:
  submits the TCP Session to the TCP Session Ring Buffer;
  adds the payload buffers to the end of Free payload chain; and/or
  sets session descriptor's freed field, so the session may not be submitted twice ses_free( ) subroutine may not erase payload and/or session data: it may merely mark the buffers as available while they are processed by asynchronous applications via the TCP Session Queue API.

Packet Processing Cycle Overview

Figure 16:
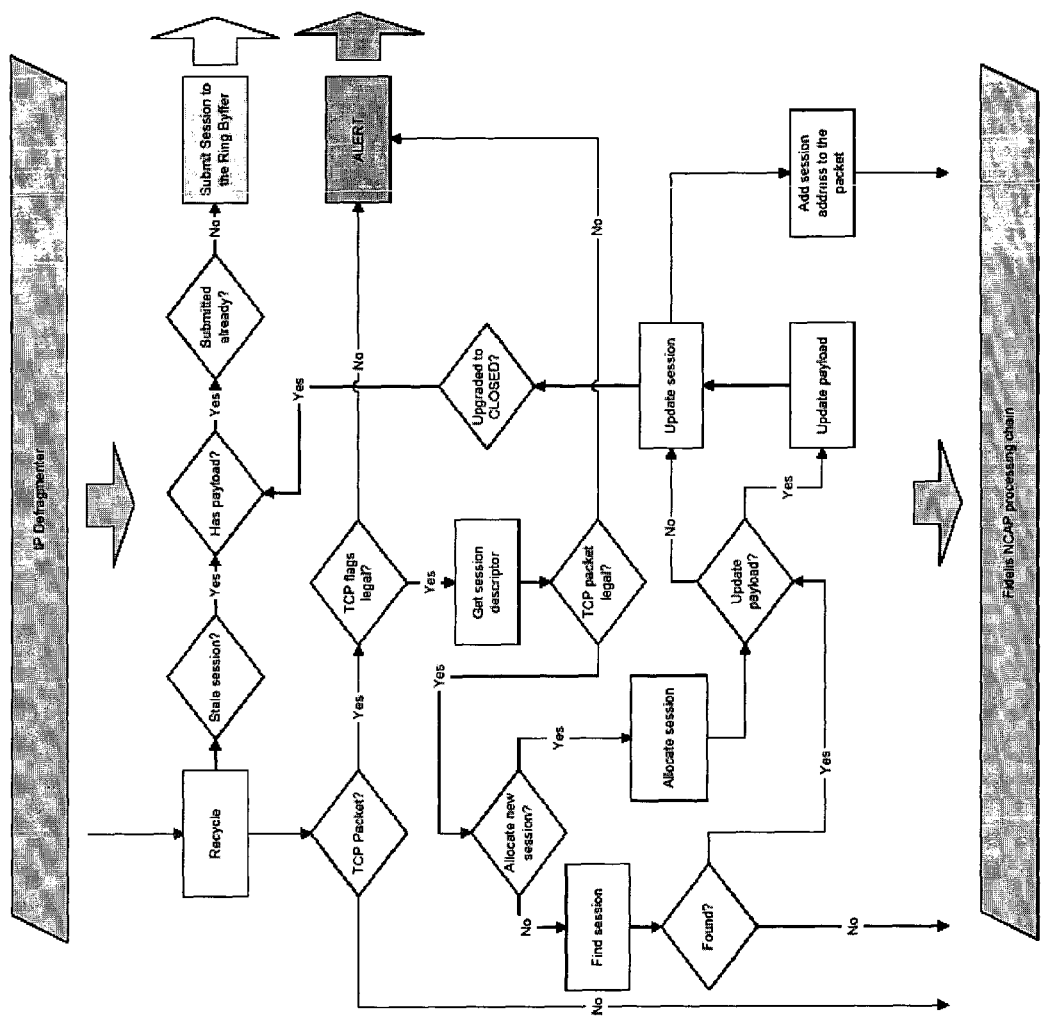
FIG. 16 depicts a flow diagram of one embodiment of a TCP reassembler of FIG. 1.

The TCP Reassembler's entry point subroutine, tcps( ), may be called every time new packet data is coming from the IP Defragmenter. First, tcps( ) may call ses_recycle( ), (see TCP session de-allocation section) then may check that the data is indeed a TCP packet (see, for example, FIG. 16). If the incoming packet has not been recognized as a TCP packet, tcps( ) may end.

The TCP packet may then be probed for multitude of illegal TCP flag combinations (e.g., the presence of SYN and FIN flags together). An alert may be generated for invalid TCP packets if the alert configuration flag is set; after that, such packets may be ignored.

Otherwise, packet's source and destination addresses and ports (socket pair information) may be used to calculate the hash value and identify the corresponding session descriptor for the packet. The Packet Analysis phase may follow, based on flags the packet bears and whether or not the session descriptor was found. This phase may attempt to identify illegal packets; for example, if the packet contains SYN flag and the session descriptor is already allocated, the analysis may include comparison of stream's ISN with the packet's SEQ number and examination of the corresponding timeout. As the result of this particular analysis, this packet may be recognized as:

TCP retransmission attempt;
The beginning of the new TCP session; and/or
TCP session spoofing/hijacking attempt.

Illegal TCP packets determined by this analysis may be ignored and/or reported.

At this point, all illegal packets may be filtered out. The session/packet combination may be analyzed next. Depending on the session state and packet flags/payload, one or more of the following actions may take place:

packet's payload is stored in the Payload buffer;
new session is allocated;
stream's state is upgraded;
session's state is upgraded;
session is submitted to the TCP Session Ring Buffer; and/or
stream's base value is increased to compensate for the sudden jump in the stream's SEQ value.

At the end of tcps( ), the packet may be annotated with the address of the TCP session it belongs to and sent for further processing to the rest of the pipeline.

TCP Reassembler Unloading

The TCP Reassembler may de-allocate shared resources using atexit( ) facility during normal exit. If the application has received a reconfiguration request, for example, from the Process Manager during reconfiguration cycle, the shared memory and semaphore array may be left intact. The module may reread its configuration files, while all other modules continue normal operation. The reload operation may be quick; reloaded TCP Reassembler module may attach to the shared resources again without resetting them and continue its duties.

Payload Decoder

Figure 17:
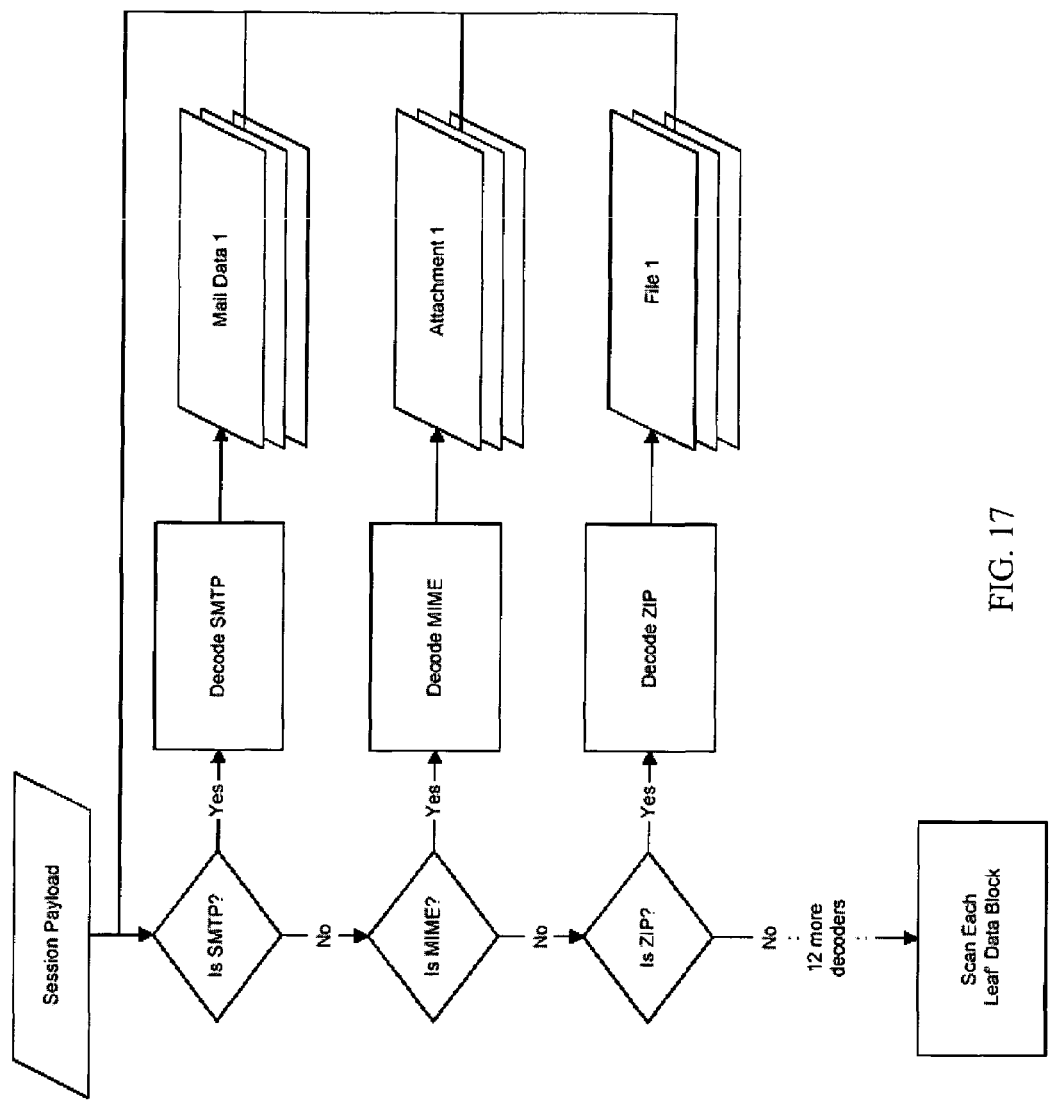
FIG. 17 depicts a flow diagram of one embodiment of a content decoder of FIG. 1.

One embodiment of the platform may operate on the real-time network traffic (e.g., 100 Mbps and/or higher or lower) and may be supported by multiple layers of content decoding that "peels off," for example, common compression, aggregation, file formats, and encoding schemas and extracts the actual content in a form suitable for processing. One embodiment of a Payload Decoder (see, for example, FIG. 1) may work recursively inspecting a payload for known data formats, decoding it with the help of the respective decoders and repeating the same procedure for the decoded content (see, for example, FIG. 17). The payload decoder may include a plurality of decoders (e.g., 14 decoders, or more or less), for example, for various Microsoft Office formats, Email, HTML/XML, compressed data, HTTP, other popular TCP-based protocols, etc. The Payload Decoder may stop when it cannot decode its input data any further, or it reaches its memory limit. In any case, decoded data chunks may be sent, for example, to one or more content scanners (e.g., keyword and/or MCP scanners) for inspection.

The payload decoder may include one or more decoders:
SMTP Mail Session;
Multipart MIME Envelopes;
Quoted-printable Mail Attachments;
Base64 Mail Attachments;
8-bit Binary Mail Attachments;
ZIP Archives;
GZip Archives;
TAR Archives;
Microsoft Word Documents:
Microsoft Excel Documents;
Microsoft PowerPoint Documents;
PostScript Documents;
XML Documents; and/or
HTML Documents.

Plain text and/or binary documents may be scanned directly and may not have any specialized decoding. Additional decoders may be plugged into the system, for example, with the help of the Decoder API.

Initialization

The initialization phase for the content decoder module may start by calling the TCP Session Reassembler API to get registered as a client and get access to reassembled sessions. After that, memory may be allocated to store statistical information and the local memory management mechanism may be initialized. Individual decoders may get registered by calling the init_decoders( ) procedure that collects the information about available decoders and may copy it to the global statistical information area in shared memory. It may also initialize each decoder by calling its init( ) method, allowing decoders to have their own data initialized.

Memory Allocation

Decoders may allocate new data buffers for each decoded component data block, for example, by calling the dq_alloc( ) procedure. Some decoders (e.g., Microsoft Word's) may allocate a single data block for decoded data; others (e.g., ZIP) may allocate multiple blocks—one block per component. Each call to the dq_alloc( ) may pass the requested memory size together with location information used to assemble hierarchical 'path' uniquely identifying the location of the decoded buffer within the original payload. Decoding paths may be used to report successful identifications as well as to provide statistics and decoding progress information.

The memory requested by the dq_alloc( )'s caller may not be available for physical reasons or as the result of artificial restriction. Each module may have its own memory cap, so that every process may stay within its limits and the overall system performance may not depend on the assumptions that the incoming data is always correct. Some decoders like ZIP may only provide estimated size for the decoded memory block; one or more decoders may be ready to accept smaller blocks and thus be limited to partial decoding. All decoders may be written to support partial decoding.

Format Recognition and Decoding

Decoders may be called via a common Decoder API's decode( ) method. Each decoder may perform its own format recognition and may return 'format not recognized' result in case of mismatch or internal decoding failure. If decoder has allocated data blocks via dq_alloc( ), it may free them via dq_clear( ) before returning the 'not recognized' result. A decoder can produce partial results due to memory restrictions; this may not be considered a failure. As soon as a buffer is decoded, its memory may be freed and excluded from the loop (effectively replaced by one or more decoded buffers).

Figure 18:
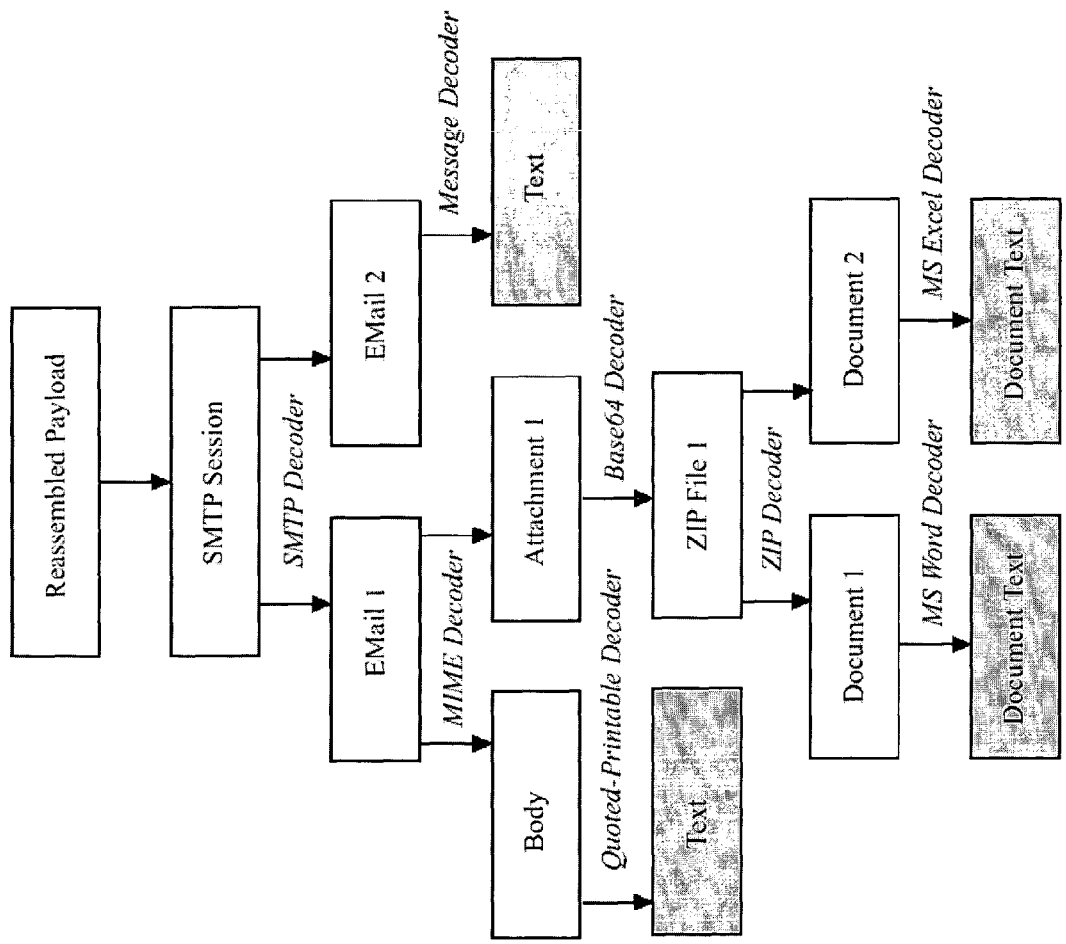
FIG. 18 depicts one embodiment of a content decoding tree.

In addition to memory limits, the Content Decoder may set a separate limit on the length of the decoding queue, limiting the size of the decoding 'tree' (see, for example, FIG. 18) and, as a result, the time needed to decode all its elements. In high-load setting this may allow to balance the need to decode every component of the given payload with the need to finish decoding before the next payload becomes available. The default value of the queue length parameter (DQ_MAX_LEN) may be 100 (or more or less).

The fact that the decoding queue may be limited may impact the decoding tree traversal strategy. The Content Decoder may use 'depth first' strategy, giving, for example, preference to decoding at least some blocks 'to the end' instead of incomplete decoding of larger number of blocks.

Scanning

Data buffers for which no (more) suitable decoders may be found or no more decoding is possible due to the artificial limitations (e.g., 'leaves' of the decoding tree) may be sent for inspection such as, for example, keyword and MCP scanners. Each payload may get inspected in 'raw' and/or decoded form.

Content Scanning

Content scanning may be aimed at preventing unauthorized transfers of information (e.g., confidential information and intellectual property).

Keyword Scanner

Keyword Scanning may be a simple, relatively effective and user-friendly method of document classification. It may be based on a set of words, matched literally in the text. Dictionaries used for scanning may include words inappropriate in communication, code words for confidential projects, products, or processes and/or other words that can raise the suspicion independently of the context of their use. Some context information can be taken into account by using multi-word phrases, but for larger contexts this may lead to combinatorial explosion.

One embodiment of an Automatic Keyword Discovery (AKD) tool can discover keywords and/or keyphrases; a threshold on the length of the keyphrase can be entered as a parameter. The AKD tool may accept a list of files, extract the textual information, and prepare word and/or phrase frequency dictionaries for "positive" training sets (e.g., documents belonging to the "protected" class). These dictionaries may be compared against standard dictionaries and/or dictionaries prepared from negative training sets (e.g., representing "other" documents). A standard Bayesian classification procedure (see, for example, Cheeseman, P., Self, M., Kelly, J., Taylor, W., Freeman, D., & Stutz, J. (1988). Bayesian classification. In Seventh National Conference on Artificial Intelligence, Saint Paul, Minn., pp. 607-611.) may be used to assign weights to keywords and/or keyphrases whose frequencies on the positive sets are significantly different from frequencies on the negative sets. In the end, normalized weights may be assigned to one or more keywords and/or keyphrases, they are sorted and the tool returns, for example, top 100 (or more or less) for manual inspection.

Lists of weighted keywords and/or keyphrases may be loaded into Keyword Scanner component that may scan each chunk of data coming out of the payload decoder for the presence of keywords. Matching may be performed by a single-pass matcher based on a setwise string matching algorithm (e.g., Setwise Boyer-Moore-Horspool) (see, for example, G. A. Stephen. String Search—Technical Report TR-92-gas-01. University College of North Wales, October 1992). The matches, if any, may be evaluated by a scoring function, and if a preset score threshold is reached, an alert may be generated.

AKD Tool Data Flow

The AKD tool can discover both keywords and key phrases based on customer-specific data such as, for example, proprietary documents and/or databases. AKD may be based upon the traditional 'naïve' Bayesian learning algorithm. Although this algorithm is rather simple and its assumptions are almost always violated in practice, recent work has shown that naive Bayesian learning is remarkably effective in practice and difficult to improve upon systematically. Probabilistical document classification may be one of the algorithm's application area.

Figure 19:
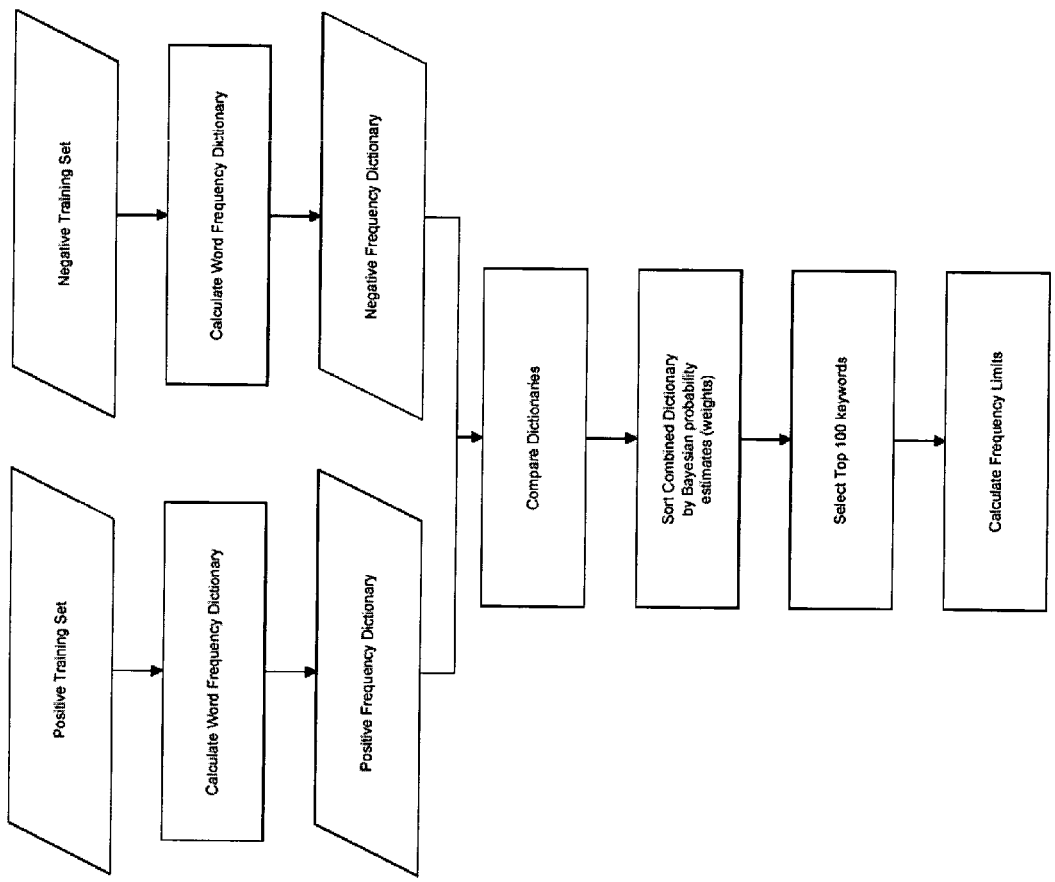
FIG. 19 depicts a flow diagram of one embodiment of an automatic keyword discovery tool.

The algorithm may use representative training sets for both positive and negative data (e.g., documents) (see, for example, FIG. 19). The sets may be used to assemble word/phrase frequency dictionaries. The dictionaries for positive and negative sets may then be compared and the words/phrases may be assigned Bayesian probability estimates. Words/phrases with high estimates can be used to guess the type of the sample document because of their close association either with positive or with negative training samples. Words/phrases from the combined dictionary may be sorted by the resulting weights and the algorithm may return, for example, the top 100 of them.

The negative set may be large, for example, combining locally calculated frequency dictionary for the negative set with a public frequency dictionary for business correspondence. In specific application areas, domain-specific frequency dictionaries can be used to represent negative training sets.

Positive training set may be used to calculate positive frequency dictionary. Since the dictionaries' sizes can vary, the frequency counts in both dictionaries may be normalized using respective counts for three most often used English words (e.g., 'the', 'of', 'and'). Non-English application areas may use specialized normalization rules (e.g., normalize by total word counts).

In addition to basic word frequency-based pass that produces keywords, AKD may allow one to derive key phrases. Key phrases may be more useful than keywords because of their higher precision, but direct combinatorial enumeration may result in enormous dictionaries of very low practical value. AKD may use a non-combinatorial approach that may be suited for mixed text/binary files such as, for example, database records. It may be based upon the text string extraction algorithm equivalent to the one provided by Unix 'strings' utility. Data files may be marked up to determine the places where data stream is interrupted (for example, switches from binary to text or vice versa); short text strings between two interruptions are taken as 'key phrases'. These key phrases may then be identified in the negative training set and the respective key phrase frequency dictionaries may be created. These dictionaries may be used in a manner, similar to keyword dictionaries described above.

When the most useful keywords/key phrases are identified and their weights are calculated, the last act may be to calculate maximum frequencies. Maximum frequencies may be used to limit the sensitivity of the Keyword Scanner to high number of keyword matches that usually causes false positive identifications.

Maximum frequencies may be calculated using the same normalized frequency dictionaries. To lower scanner's sensitivity, the average number of matches per 1000 bytes of training data multiplied by two may be taken as the limit for 'useful' keyword/key phrase matches. All matches that go beyond this limit may be ignored (e.g., they do not contribute to the final score).

Keyword Scanner Data Flow

Keyword Scanner may be based on a setwise string matching algorithm. For example, the Keyword Scanner may use setwise extension of Boyer-Moore-Horspool algorithm that uses a Finite-State Automata (FSA). Set of input strings (e.g., keywords and/or key phrases) may be turned into a FSA using the same technique as in Lex scanner tool. In addition, Boyer- Moore-Horspool skip table may be added to achieve sublinear search time. The performance of the algorithm may not grow with the number of the keywords/key phrases, although the memory requirements may grow. Also, the algorithm's performance may depend on the length of the shortest string in the set (e.g., really short strings may turn the performance to linear and slow down the algorithm).

Figure 20:
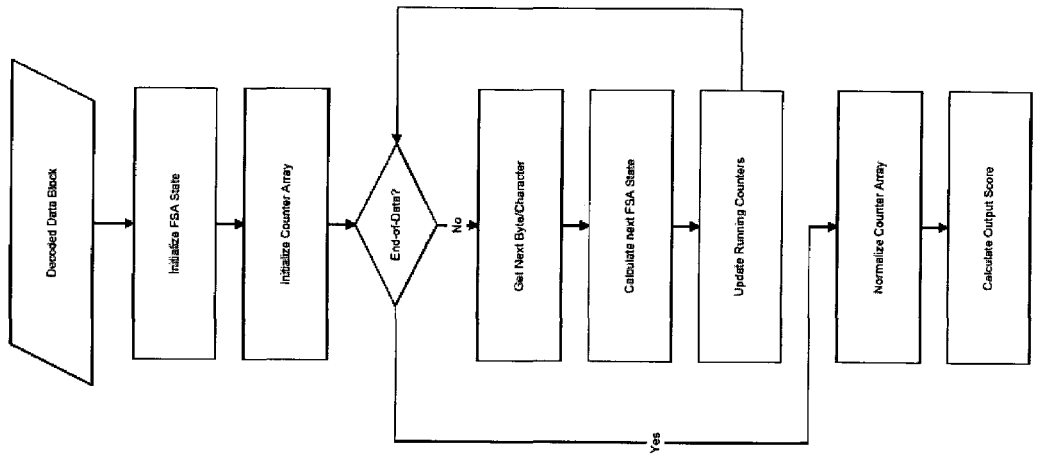
FIG. 20 depicts a flow diagram of one embodiment of a keyword scanner of FIG. 1.

The matching may be performed "in parallel", meaning that the algorithm may need only one pass over the data (see, for example, FIG. 20). All matches may be flagged in a separate match counts array. The array may contain one counter per keyword/key phrase.

Initially, all counters may be set to zero. For each match, the respective counter may be incremented. When the scanner reaches the end of the data block, the counters array may be normalized to reduce the importance of frequent matches according to the preliminary profiling done by the AKD tool. This tool can discover both keywords and key phrases based on customer-specific data such as, for example, proprietary documents and databases. Each discovered keyword/key phrase may be returned with two associated numbers: the score for each match and the maximum number of matches per 1000 bytes of input data. Both numbers may be calculated based on the training data; they may reflect the relative importance of the keyword and its expected frequency.

Normalization may limit each match counter to be less than or equal to the maximum match count for the given keyword/key phrase (e.g., adjusted to the size of the input buffer). After that, the counters may be multiplied by the corresponding match scores, summed up and normalized to get a per-1000 bytes output score.

To estimate document match, Keyword Scanner may compare the output score with the configurable threshold value.

Initialization

The module may be initialized by loading keywords/key phrases data from external files, specified via –k parameter to the Extrusion Prevention module, for example, via a load-kwv( ) routine. The command line may be stored in the common configuration file; keyword files may be generated by the AKD tool from user's sample data files. Each keyword file may contain the identification information (e.g., training set name), one or more alert information records (e.g., alert ID, description, and score threshold), and the list of keyword/relative score/match limit triples. A new memory block may be allocated for each keyword file; loaded keyword files may be kept in a chain and used to calculate the corresponding scores.

After loading keyword files, the module may register itself to accept data coming from the Content Decoder. Also, to be able to generate alerts, it may establish the connection with the platform's Alert Facility.

The last initialization act may be building FSAs for keyword files. Each set of keywords may be used to calculate a finite state automaton, for example, based on Aho-Corasick prefix tree matcher. The automaton may be structured so that every prefix is represented by only one state, for example, even if the prefix begins multiple patterns. Aho-Corasick-style FSAs may be accompanied by Boyer-Moore-Horspool skip tables calculated from the same string sets. An FSA together with the corresponding skip table may scan the data for all keyword matches in one pass. The algorithm used may be Setwise Boyer-Moore-Horspool string search.

For each incoming data block, the list of matching scores may be calculated, one score per the loaded keyword file. To calculate the score for a keyword file, a fsa_search( ) procedure may be called with the corresponding FSA and skip table as parameters. The fsa_search( ) procedure may register all keyword matches by incrementing match counters in the counter array. The array may contain one counter per keyword/key phrase; the counters may be initially set to zero and incremented on each match.

When the search is over, counters may be used to calculate the data block's score for the given keyword set. To calculate the score, each counter may be checked against the respective match limit, loaded from the keyword file. If a counter is greater than its match limit, its value may be set to the match limit. When all the counters are clipped this way, they may be multiplied by the respective relative score values, loaded from the keyword file. The counters multiplied by relative scores may be added up and the result may be normalized, for example, to 1000-byte block size yielding the final score for the given keyword file.

The final scores may be compared with thresholds, stored in the corresponding alert information record (AIR) lists loaded from keyword files. The largest threshold less or equal to the given score defines what alert may be generated; all the necessary information to generate the alert may stored in the corresponding AIR.

Multidimensional Content Profiling (MCP) Scanner

Like keyword scanning, MCP can capture characteristics (e.g., essential characteristics) of a document and/or a data file, while tolerating variance that is common in the document lifetime: editing, branching into several independent versions, sets of similar documents, etc. MCP can combine the power of keyword scanning and/or digital fingerprinting (Tomas Sander (Editor), Security and Privacy in Digital Rights Management, ACM CCS-8 Workshop DRM 2001, held Nov. 5, 2001 in Philadelphia, Pa., USA.).

Content Profiling may be a combination of techniques targeted at identification of documents belonging to a certain document class. Documents in the same class share similar statistical characteristics, for example, determined in the course of a preparatory process called profiling. An Automatic Content Profiler (ACP) tool may accept a representative set of documents belonging to the class (positive training set), accompanied, if necessary, with a negative training set (documents similar to, but not belonging to the class). The profiling process for a class may be performed only once; the resulting set of statistical characteristics (e.g., the profile) may be used to test for membership in the class.

The quality of the profile may depend on the ability of the profiling algorithm to capture characteristics common to all documents in the class; it can be improved by use of multiple unrelated characteristics of a different nature. Each characteristic may define a dimension (e.g., a quantitative measure varying from one document to another). The content profiling component may use more (or less) than 400 different characteristics calculated, for example, in real time for all data passing through the network. Each document (e.g., data chunk returned by the Payload Decoder) may be mapped to a single point in a multi-dimensional space; its position in this space may be used to calculate class membership (membership in more than one class can be identified) and may trigger an alert and/or reactive measures.

Content profiling methods has been used by crypto analytics for many years. Although still valuable, simple statistical characteristics work best when complemented by high level statistical methods, operating on larger elements such as words and sentences.

A multi-dimensional profiler may operate with a combination of about 200 low-level statistical measures and 100 or so high-level ones. High-level statistic properties may be designed with certain business-related problem areas in mind (e.g., protection of confidential personal information related to individuals' health records, bank account information, customer lists, credit card information, postal addresses, e-mails, individual history, SSN, etc.); it can be re-targeted to other areas by adding new domain-specific dimensions.

In addition to individual high-and low-level characteristics summarizing overall usage of the given elements, the profiler may have over 100 dimensions dedicated to spatial structure of the document, including mutual co-occurrence and arrangement of the elements. As an example, it can capture the fact that in postal addresses, state names and ZIP codes have very similar frequency, interleaving each other with ZIP codes closely following state names. Spatial analysis may be used for capturing the overall structure of a document; indexes, lexicons, and other types of documents that can have usage patterns similar to the target class may not easily fool it.

When the ACP tool profiles a training document set, it may generate as many points in the multidimensional attribute space, as are documents in the set. Each point represents an individual document (or a section of a document) and may be marked as "+" (in a class) or "−" (not in a class). The final learning act may calculate the simplest partitioning of the attribute space that separates "+" and "−" points with minimal overlap. This partitioning may be automatically "digitized" into a data-driven algorithm based on Finite State Automata (FSA) that serves as a fast single-pass scanning engine.

The FSA generated by the profiler may be loaded into the MCP Scanner component that inspects each chunk of data coming out of the payload decoder. A probabilistic measure of membership in the class of "protected" documents may be calculated for each data chunk. If a preset threshold is reached, an alert may be generated.

MCP-generated alerts may be combined with alerts produced, for example, by Keyword Scanner on relative-weight basis, depending on document type. The combination of content scanning methods leads to reliable recognition of protected data.

The MCP module may work in first-in-class Extrusion Prevention system. Prevention mode may mandate real-time analysis and malicious session termination before the data is fully transferred. An API may allow for an arbitrary (configurable) number of connection points, each point may send reference to the reassembled session data to up to 32 content-scanning modules running in parallel with the main packet capturing cycle. Each connection point may be supplied with links to reassembled session data on a round-robin basis. Connection Point itself may be implemented as a ring buffer, for example, combining FIFO abilities with automatic overflow protection. It may hold the last 128 sessions and track each module's position in the buffer independently, effectively smoothing out spikes in the traffic and differences in content analysis module processing speed.

Experience shows that for network traffic usual for small-to-medium companies it may be enough to use 2-processor Intel-based hardware with fast NICs. Larger companies or congested network lines may use more processing power in 4-processor servers.

ACP Tool Data Flow

The Automatic Content Profiler (ACP) tool may accept a representative set of documents belonging to the class (positive training set), accompanied, if necessary, with negative training set (documents similar to, but not belonging to the class). The profiling process for a class may be performed only once; the resulting set of statistical characteristics (the profile) may be used by the MCP Scanner.

Figure 21:
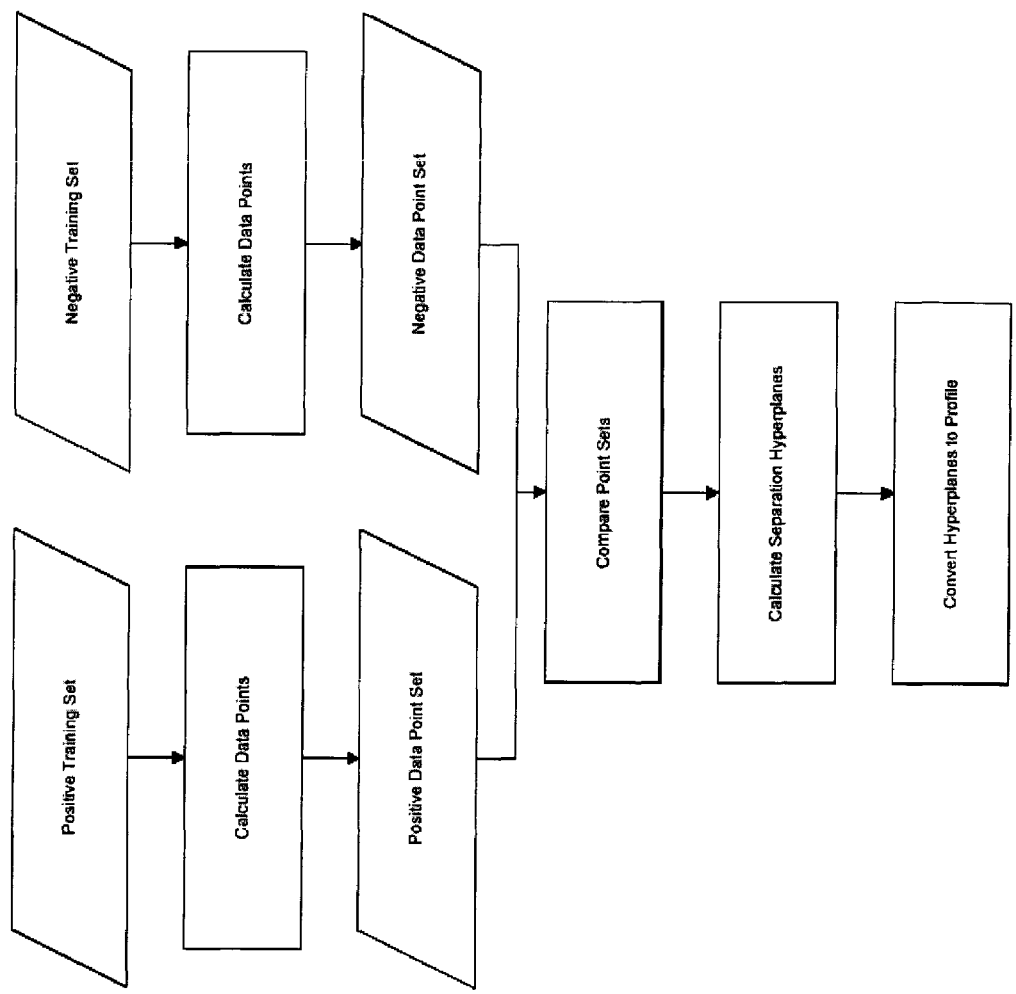
FIG. 21 depicts a flow diagram of one embodiment of an automatic content profiler tool.

ACP tool may operate in three phases (see FIG. 21). First, all documents in the positive and negative training sets may be measured by the same algorithm used at run-time by MCP Scanner. The algorithm may represent each document as a point in a multidimensional space (one dimension per statistical attribute, 420 dimensions (more or less) total). The final scoring act of the scanning algorithm may not be used, because scoring may require an existing profile. At the end of the first phase there are two sets of points, for example, in 420-dimensional space; the sets may correspond to positive and negative training sets.

Figure 22:
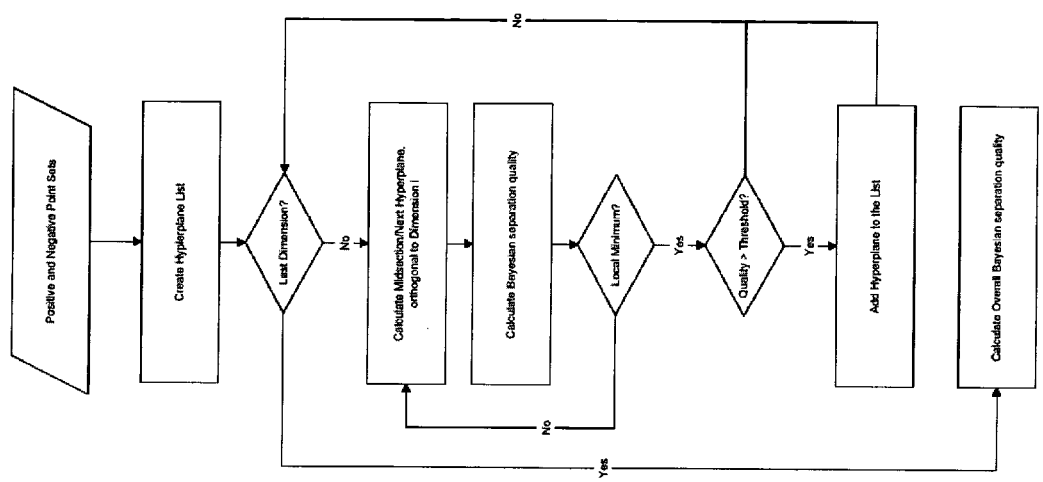
FIG. 22 depicts a flow diagram of one embodiment of a hyperplane calculation.

The resulting sets may overlap to various degrees along different dimensions. The job of the second phase may be to find practical set of hyperplanes to effectively separate points representing positive and negative sets (see FIG. 22). Since the algorithm may be statistical by nature, a probabilistic criteria may be used to determine separation quality. Bayesian conditional probability of improper classification as a function of hyperplane position may be minimized by a simple descent algorithm. To improve run-time performance of the scanner, one may use only hyperplanes orthogonal to one of the axes (one may work with the projection to a single dimension). This method produces simple-to-execute profiles; its quality may be sufficient in most cases due to the number (e.g., large number) of dimensions considered. If the minimal useful separation quality for the given dimension is not achieved, the dimension may be ignored. The overall quality of the combined set of separation hyperplanes may also be evaluated by Bayesian probabilistic criteria.

When the set of hyperplanes is calculated, the final act may be to convert it to the format that can be loaded into the scanner (e.g., a profile). MCP Scanner may interpret profiles with the help of a machine (e.g., a virtual machine ("VM") that can perform about 20 simple arithmetical operations on normalized dimensions). Using VM instead of hard-coded parameterized score calculator allows some flexibility in executable representation of separation surface; it can be used as-is for non-orthogonal hyperplanes or hand-coded profiles (profiles may have readable ASCII representation that can be edited manually).

The resulting profiles can be loaded into MCP Scanner at initialization time. MCP Scanner may support multiple profiles; for each data block, the measurement algorithm may run once; the score calculation algorithm may run as many times as there are profiles loaded.

Maximum frequencies may be calculated using the same normalized frequency dictionaries. To lower scanner's sensitivity, the average number of matches per 1000 bytes of training data multiplied by two may be taken as the limit for 'useful' keyword/key phrase matches. All matches that go beyond this limit may be ignored (they do not contribute to the final score).

MCP Scanner Data Flow

Figure 23:
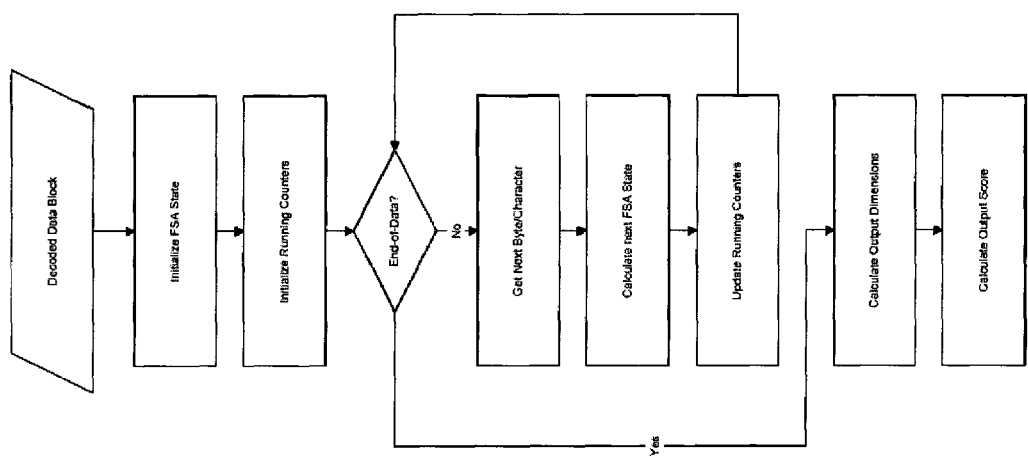
FIG. 23 depicts a flow diagram of one embodiment of a multi-dimensional content profiling scanner of FIG. 1.
Figure 25:
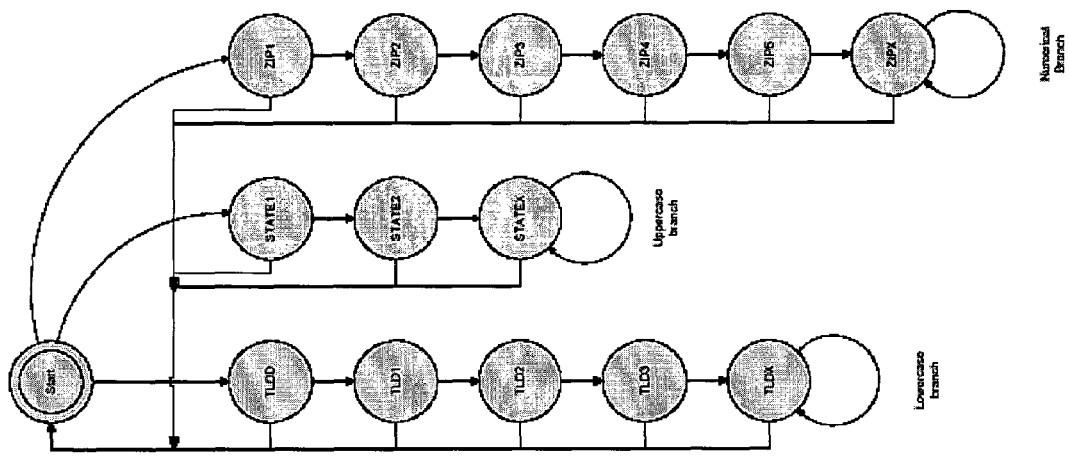
FIG. 25 depicts one embodiment of a content scanner finite-state automata.

MCP Scanner may be based on a Finite-State Automata (FSA). FSA may be encoded as a set of code fragments representing each state and a set of jumps that transfer control from state to state (see, for example, FIG. 25, showing level 1 states, tracking the calculations, related to low-level features (e.g., character and numerical counters). Additional state may be stored in extra state variables to allow the calculation of high-level features.). FSA starts in the initial state and may stop when the input stream is empty. Each fragment representing a state encodes the set of actions depending upon the value of the next data byte/character extracted from the input stream. MCP's FSA may be hard coded; it may implement an algorithm that calculates a number of running counters, for example, in parallel. MCP may use 500 running counters (or more or less); each state may update some of them, based on the input byte. There are multiple MCP counters with different meaning:

- Character counters: Number of characters of a certain class
- Character position counters: Last position of a character of a certain class
- Character distance counters: Sum of distances between characters of a certain class
- Numerical value counters: Running values of decimal numbers (SSN/CCN/ . . . )
- String value counters: Running values of strings (e.g. top-level domain names)
- Feature counters: Number of high-level 'features' of different types
- Feature position counters: Last position of high-level features
- Feature distance counters: Sum of distances between certain features MCP may update counters in order (see FIG. 23); features may be calculated based on current FSA state, values of character counters and contents of the numerical/string value counters. Each feature may be validated either by looking it up in a hash table of predefined features (this works with two-letter state abbreviations, ZIP codes, top-level domain names and e-mail addresses) and/or by a dedicated validator algorithm (checksums or ranges for SSN and CCNs). When a feature such as an SSN is calculated, the algorithm may update respective high-level counters. Two-layer structure may allow effective one-pass 'parallel' calculation of multiple characteristics of input data.

When all data is processed, the counters may be used to calculate the values of output dimensions: relatively independent characteristics of input data. Each dimension may be based on values of one or more counters. Dimensions may be calculated by normalizing counter values; normalization may include the following operations:

- dividing counters by the total number of bytes
- subtracting counters from each other to get relative 'delta' measures
- dividing counters by each other to get relative 'factor' measures
- subtracting and dividing derived measures MCP's FSA may be tailored toward domain-specific dimensions (e.g., customer/client information), but is not specific to a particular customer. MCP's FSA may calculate a plurality (e.g., 420) output dimensions.

Figure 24:
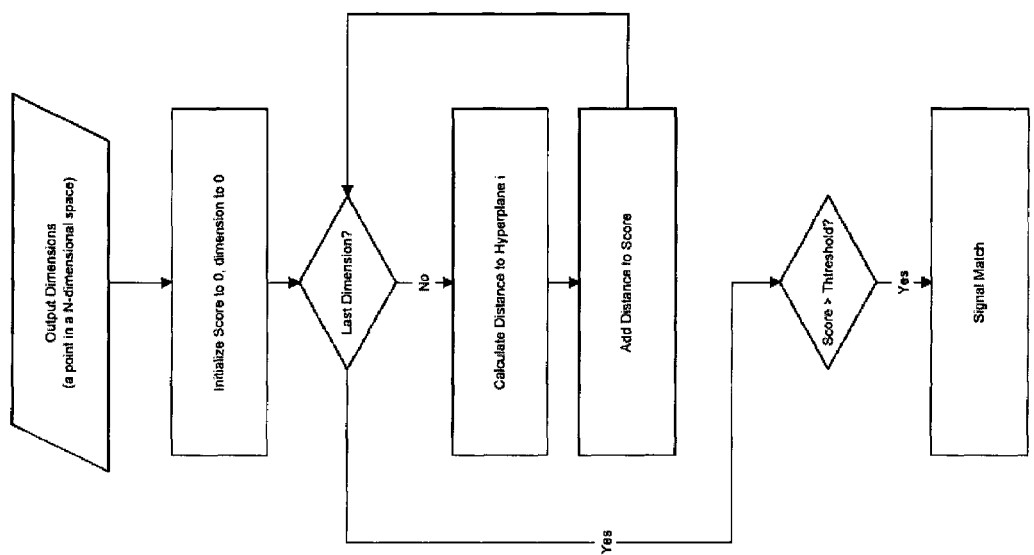
FIG. 24 depicts a flow diagram of one embodiment of an output score calculation.

The last act may be calculating output score (see FIG. 24). This act may use data prepared by a separate MCP Profiling tool that builds statistical profiles based on customer data. Profiles may be multidimensional surfaces separating the multi-dimensional (e.g., 420-dimensional) space onto two subspaces, one of which corresponds to the set of target documents (the data that needs to be identified). MCP may represent the dividing surface as a set of hyperplanes, each cutting the space onto two subspaces, one of which contains the target subspace.

Calculating target subspace membership may use a series of calculations for each hyperplane; if the point in question is on the 'right' side of all hyperplanes, it belongs to the target subspace. The output score may be calculated as a sum of distances between the given point and all hyperplanes (being on the 'wrong' side of a hyperplane is treated as negative distance). The score may be calculated by a simple virtual machine (MCP Score VM, see Table 1 below), "programmed" by the ACP Tool. The positive score may not guarantee proper subspace membership; the negative score may guarantee non-membership. Since multidimensional surfaces, calculated by the MCP Profiling tool may be just approximations of the real document membership, proper membership in target subspace may not be a requirement. To estimate document membership, MCP Scanner may compare the output score with the configurable threshold value.

Implementation Details

The module may be initialized by loading profile data from external files, for example, specified via –f parameter to the Extrusion Prevention module via a loadfpv( ) routine. A command line may be stored in the common configuration file; profile files may be generated by the ACP tool from user's sample data files. Each profile file may contain the identification information (profile name), one or more alert information records (alert ID, description, and score threshold), and the list of MCP Score VM instructions. A new memory block may be allocated for each profile; loaded profiles may be kept in a chain and used to calculate the corresponding scores.

After loading profiles, the module may register itself to accept data coming from the Content Decoder. Also, to be able to generate alerts, it may establish the connection with the platform's Alert Facility.

For each incoming data block, MCP Scanner may calculate the set of output dimensions. Output dimensions may be calculated from the array of running counters. This array may include a plurality (e.g., 8) of subdivisions:

1. Uppercase letter counters (UC division)
2. Lowercase letter counters (LC division)
3. Zip code counters (ZIP division)
4. State abbreviation counters (STE division)
5. Email address counters (AT division)
6. Top-level domain names counters (TLD division)
7. Credit card number counters (CCN division)
8. Social Security number counters (SSN division)

Each subdivision may include about 60 counters (or more or less), tracking values, positions, and/or distances. All counters may be 32-bit integers except for specialized ones, used to track SSNs and CCNs (e.g., 64-bit integers may be used for long numbers). High-level values may be validated by specialized validation algorithms; for all divisions except SSN and CCN, the validation part may include looking up the collected information in a pre-sorted array of legal values via bsearch( ) routine. For SSNs and CCNs, specialized validation code may make sure that numbers are in allowed ranges, do not contain impossible digits and pass the checksum test.

Calculation of relative positions of low- and high-level elements may be based on distance counters. Each subdivision, for example, may employ 50 distance counters (or more or less), counting occurrences of two features of the same type spaced out by 0-49 characters respectively. For lowercase letter, the distances to the most recent uppercase letter are counted; for high level features, additional counters track the distances between ZIP codes, top level domain names and email addresses. Taken together, the counters may capture document structure, typical for user records, containing a combination of a name, postal address, email address, social security and credit card numbers in correct order (some elements can be absent).

MCP Scanner may interpret profiles with the help of a simple virtual machine (MCP Score VM) that can perform, for example, about 20 simple arithmetical operations on normalized dimensions. Using VM instead of hard-coded parameterized score calculator may allow some flexibility in executable representation of separation surface; it can be used as-is for non-orthogonal hyperplanes or hand-coded profiles (profiles have readable ASCII representation that can be edited manually). Due to simple nature of multidimensional surfaces, calculated by the MCP Profiling tool, only 5 operations (or more or less) may be used:

TABLE 1

Common Score VM commands

| VM Operation | Description |
| --- | --- |
| FPOP_GT [i, c] | Adds a difference between counter i and constant c |
| FPOP_GTS [i, c, s] | Adds a difference between counter i and constant c, scaled by s |
| FPOP_LT [i, c] | Adds an inverted difference between counter i and constant c |
| FPOP_LTS [i, c, s] | Adds a difference between counter i and constant c, scaled by s |
| FPOP_DIFF [i, j, s] | Adds an absolute difference between counters i and j, scaled by s |

Each command may add a certain value to the running score counter, initially set to zero. The resulting score may be normalized to 1000 bytes and be compared with thresholds, stored in the corresponding alert information record (AIR) lists. The largest threshold less or equal to the score defines what alert may be generated; all the necessary information to generate the alert may be stored in the corresponding AIR.

Rogue Encryption Detection

The increased computing power of modern processors together with the development of e-commerce technologies brought to the desktop computer market many high-quality cryptography algorithms formerly available only for special-purpose government projects. It is hard to overestimate the benefits of the new technologies for Internet shoppers and high-tech businesses—increased confidentiality and security became a necessity in the era of total computerization. Like many technological advances though, strong encryption is a double-edged sword: By guaranteeing privacy and security to all communications, it conceals illegal activities such as, for example, theft of intellectual property.

"Rogue" encryption is recognized as a new threat to computer networks. The proliferation of wireless LANs, ad-hoc setups, and "semi-public" and unsanctioned VPNs makes networks more vulnerable to unauthorized access from outside. There is also a trend in businesses that rely on modern computer technologies to encrypt every transaction and communication channel, making the situation even worse. IT personnel can no longer tell which connections are authorized: An encrypted connection to somebody's home computer is often indistinguishable from an authorized connection to an e-commerce server. Setting up an unsanctioned VPN becomes easier. The increasing popularity of P2P software adds to the corporate network's vulnerability: Software that masquerades as legal e-commerce traffic by tunneling through HTTP can become installed even without the explicit user's request (e.g., as a side effect of installing something else). Unsanctioned VPNs create "holes" in perimeter defense; as soon as it becomes possible to transfer proprietary data to or operate intranet computers remotely from unauthorized locations, the perimeter defense is effectively gone.

Given this trend, some computer security experts recommend focusing on internal defense by securing each individual computer on the intranet as if it were directly accessible from any point outside the company's firewall. This strategy partially addresses the problem, but the total cost of such a solution is usually prohibitive: While the number of computers constituting the "perimeter" is usually very small and grows slowly, the entire intranet is much larger and growth at higher speed and would require constant attention (for example, patches and new service packs usually conflict with security software installed on the same host). Taking into account the lack of properly trained security personnel, going after each internal computer is not practical in most organizations.

In comparison, a more straightforward and economical solution is to monitor and control all outside connections limiting encryption to sanctioned sessions only (for example, inter-departmental VPNs and a limited amount of well-known e-commerce sites). This solution preserves the low total cost of maintaining perimeter defense; internal computers need to be secured in a regular way, as they used to be. Controlling rogue communication channels adds only a small fraction of the potential cost of a "total internal security" strategy.

A solution for this problem may contain a Rogue Encryption Detector (RED) component keeping track of all secure connections and alerting security personnel when an unauthorized VPN-like channel is established. As an additional benefit, it may constantly check for encrypted sessions, which parameters are outside the established range for encryption strength, version of protocol, etc.

RED component may be configured by providing a set of legal parameters (sources, destinations, protocols, key length, etc.) for encrypted traffic crossing the boundaries of the Sensitive Information Area; it may differentiate between common e-commerce activity (such as buying a book on Amazon's secure server) and attempts to establish secure P2P channels. Authorized VPN can be specified in RED's allowed sources/destinations/ports lists so that normal inter-office traffic may not cause any alerts.

RED may operate as a dedicated process getting its information, for example, from reassembled TCP session data feed. On-the-fly TCP session reassembly may allow SSL session and its attributes to be properly recognized. Each session may be checked for encryption (e.g., all common variations of SSL/TLS may be recognized) and if it is encrypted, its parameters (client EP, server IP, ports, duration, version, etc.) may be compared with a list of authorized VPNs. Regular e-commerce traffic may be allowed by default by treating short sessions initiated from inside separately.

The information gathered by the RED component may be sent to the centralized event processor and forwarded to a console where it may be stored and processed together with other related events coming from multiple sensors. This allows for correlation between "rogue VPN" attempts and other network policy violations as well as providing for centralized forensic information storage and data mining.

RED Data Flow

RED may operate on reassembled TCP sessions provided, for example, by the TCP session reassembler module. RED may determine if the session being analyzed is encrypted and if it is, determine if encryption parameters match the policy specified in the configuration file.

RED may be configured to detect SSL and/or TLS sessions (e.g., SSL version 2.0 and above, TLS version 1.0 and above). RED may not have access to key material, so it may not decrypt the contents of the session; however, the initial handshake and cipher suite negotiation messages may be sent in the clear, so the session may be encrypted and the chosen cipher suite may be available to the detector.

Figure 26:
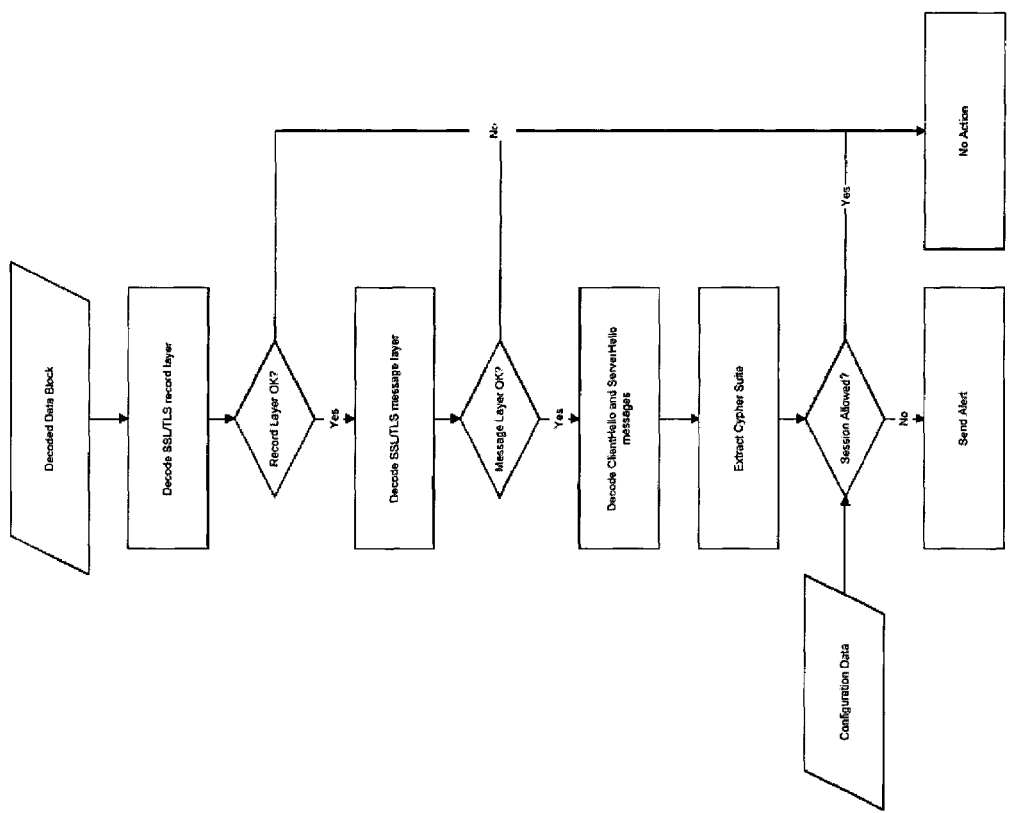
FIG. 26 depicts a flow diagram of one embodiment of a rogue encryption detector of FIG. 1.

RED may follow the layered structure of the protocols and decode the layers to get access to the information being exchanged. SSL v2.0 and SSLv.3.0/TLS 1.0 have different record and message formats and may be handled by separate decoding procedures, but the overall decoder fuinctionality may be the same (see FIG. 26).

First, RED may decode SSL/TLS record protocol layer to examine messages carried on top of it. Next, RED may identify ClientHello and/or ServerHello messages, containing the information on the negotiated cipher suite.

If on any of the above acts the decoding fails, RED may consider the session unencrypted. Security protocols may be strict and the connection may not be established with incorrect or missing data. If the decoding succeeds, RED may obtain the information on the initial cipher suite to be used to encode the conversation (the cipher suite can be changed in the middle of the conversation, but since this is not done in the clear, RED may not track the subsequent changes).

Given that the session is encrypted and the cipher suite that is used to encrypt the content, RED may perform the following checks:

- according to local policies, the given communicated parties can establish a secure connection
- the cipher suite may be strong by today's standards
- the duration of the communication is in allowed range RED's configuration file may allow one to specify which parties (IP addresses) can establish the secure channels (client and server are distinguished, so there are separate limits on initiators of secure connections). For each such record, there may be information on allowed ports, the limit on total duration of the connection, and the minimum strength of the cipher suite. Ports may be used to restrict the services being encrypted (e.g. HTTP); limits on duration may be used to distinguish short sessions used in SSL-based e-commerce from longer, potentially illegal sessions. If a connection is allowed, its cipher suite strength can be compared to a minimal acceptable level specified for this connection.

All attempts to establish connections not explicitly allowed by the configuration may be detected and sent in a form of alerts to the alert processing backend of the system. Depending on its configuration, the alert can be reported to the operator and/or immediate action can be taken (breaking down the ongoing connection).

Process Manager

An application built on the Network Content Analysis Platform ("NCAP") may include, for example, several UNIX processes working in parallel. The number of processes and their functions may vary. On the other hand, the following functionality may be provided: start, stop, and reconfigure. Reconfiguration may be needed just for a specific group of processes representing some particular function or module, while the rest of the application should continue without losing any shared data.

The 'start' and 'stop' requests may be issued by an OS during the normal bootup/shutdown sequence. The 'reconfigure' request may come from an automated download facility to perform on-the-fly reloading of a particular module, (e.g., ruleset update procedure). The total reconfiguration time may be minimized: During this procedure the application may be only partially operational.

Figure 27:
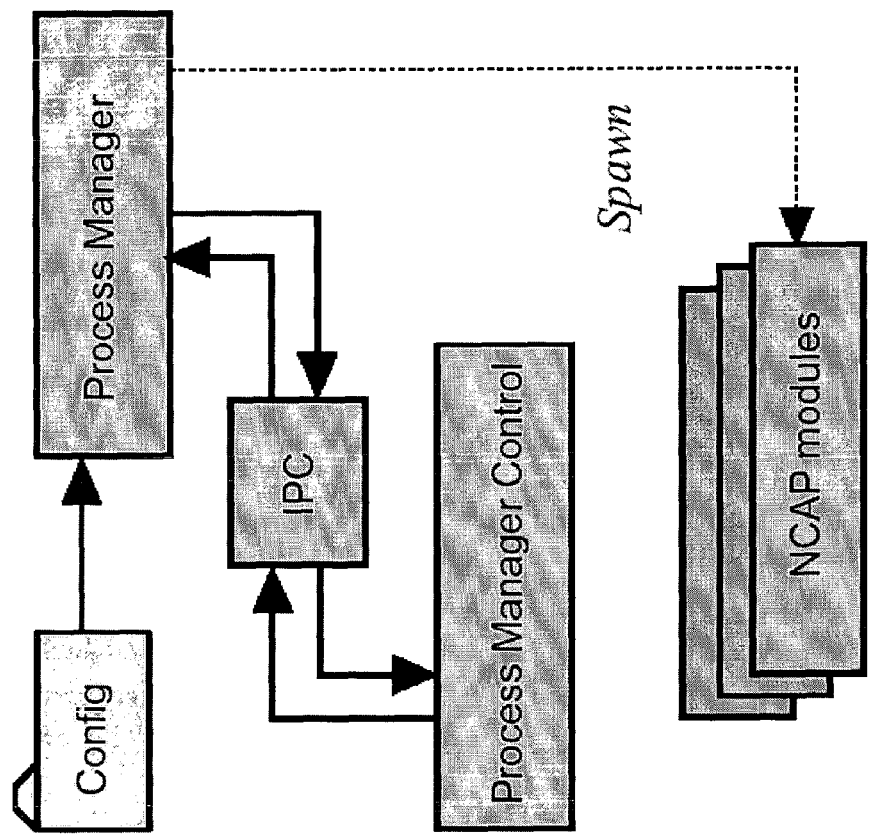
FIG. 27 depicts a block diagram of one embodiment of a process manager of FIG. 1.

The startup procedure may launch several NCAP modules (see FIG. 27). These modules may allocate and/or require different IPC resources to perform their functions. Although IPC deadlock dependencies may be resolved at the application planning stage, the start sequence may be automatic and reliable to allow for robust module recovery in case the needed resource is not immediately available.

Additional features that sometimes make the life of a support person easier: the ability to issue the reconfiguration requests manually; the ability to manually start/stop the entire application; and the ability to list currently running processes with all the necessary internal information not available via standard system utilities.

One embodiment of a Process Manager may be configured to provide a reliable process that serves as a launcher/monitor for the entire NCAP-based application. Its features may include:

- Flexible configuration; support for an arbitrary number of programs.
- Standard error reporting facility.
- Automatic module recovery.
- Recovery overload protection: If a module dies immediately after launch several times in a row, next time it will be restarted after a delay until the underlying issue is resolved.
- Standard reconfiguration facility restarts a specified module group preserving the application's shared data.

A special control utility may also be developed that connects to the main management process using yet another IPC channel after proper authorization. It may support list and reload group commands, providing a generic interface for automatic upload facilities.

Event Spooler

One embodiment of an Event Spooler may provide a generic API for event handling. It may also collect statistics and processes, filters, and reliably transfer data over the network using an encrypted channel. It may further work in 'start and forget' mode in the harsh conditions of real-life networks.

NCAP may deliver information in the form of events. An event may be the minimal essential piece of information suitable for independent processing and, later, storage and data mining. Events generated may be transferred to an Event Processing/Data Mining Console, for example, in a timely and reliable manner. The Event Processing module may apply additional layers of processing, storing the resulting information in a database, and sending SNMP and/or e-mail alerts if necessary.

Events generated by various NCAP modules may be stored in spool files. Modules may also use IPC to store real-time statistical data (e.g., number of packets processed, protocol distribution, module-specific information). Statistical data may be reset in case of an accidental power outage. Event data may have a file system level. As an additional benefit, buffered event streams can be backed up in a compressed form to allow archive storage/reload to the centralized event database.

The Event Spooler can be configured to monitor an arbitrary number of event spool directories and statistical data blocks. It may independently monitor different data sources. Each event spool file may be processed by a dedicated UNIX process (Spool Monitor) in FIFO order. Each statistical block may be polled regularly by a Status Collector process with configurable intervals. Spool Monitors may generate independent binary checkpoint files containing complete information about the Monitor's current state. The Event Spooler may be able to continue from the last incomplete transaction on each queue in case of a power cycle.

The Event Spooler may be a modular application. It may collect and route data in the form of logical streams (e.g., event stream, statistical stream, etc.). It may have an API for load on demand data-processing modules (plug-ins). Each stream can be associated with an arbitrary number of plug-ins. Plug-ins may be the only modules that have knowledge about a particular stream's internal structure. The Event Spooler may provide general-purpose MUTEX-like resources that can be shared between several data processing modules if so configured. Such architecture allows for easy expandability and reduces code maintenance efforts. Adding a new data type handling (e.g., TCP session data) into Event Spooler translates to mere efforts of changing the configuration file and writing a plug-in that recognizes this data type.

In addition to the event compression algorithm working on the sensor side, the Event Processing module may perform event processing (e.g., post-processing) and correlation upon receiving the data. A reliable and secure network data transfer may be developed using UDP-based network protocol with the following built-in features: checksum verification, packet or session-level retransmits with a Retransmit Time Calculation algorithm, server side ACL verification, on-the-fly data compression and encryption. The Event Processing module may run the server part ('Netspool') of the Event Spooler listening, for example, on port 80/UDP. It may accept data streams from each authorized sensor, tagged by the sensor's name. Based on the logical stream type, Netspool may send the data to additional processing and call a plug-in to store the data. Based on the configuration, it can also generate e-mail/SNMP messages and send the original data for further processing. In case of network outage, Spool Monitor and/or Netspool may try to send the data for up to 30 minutes (with gradually increasing timeout interval) and then exit. The finished process may be restarted by the main Event Spooler process and continue the incomplete transaction. The cycle may persist until the data is successfully sent.

Figure 28:
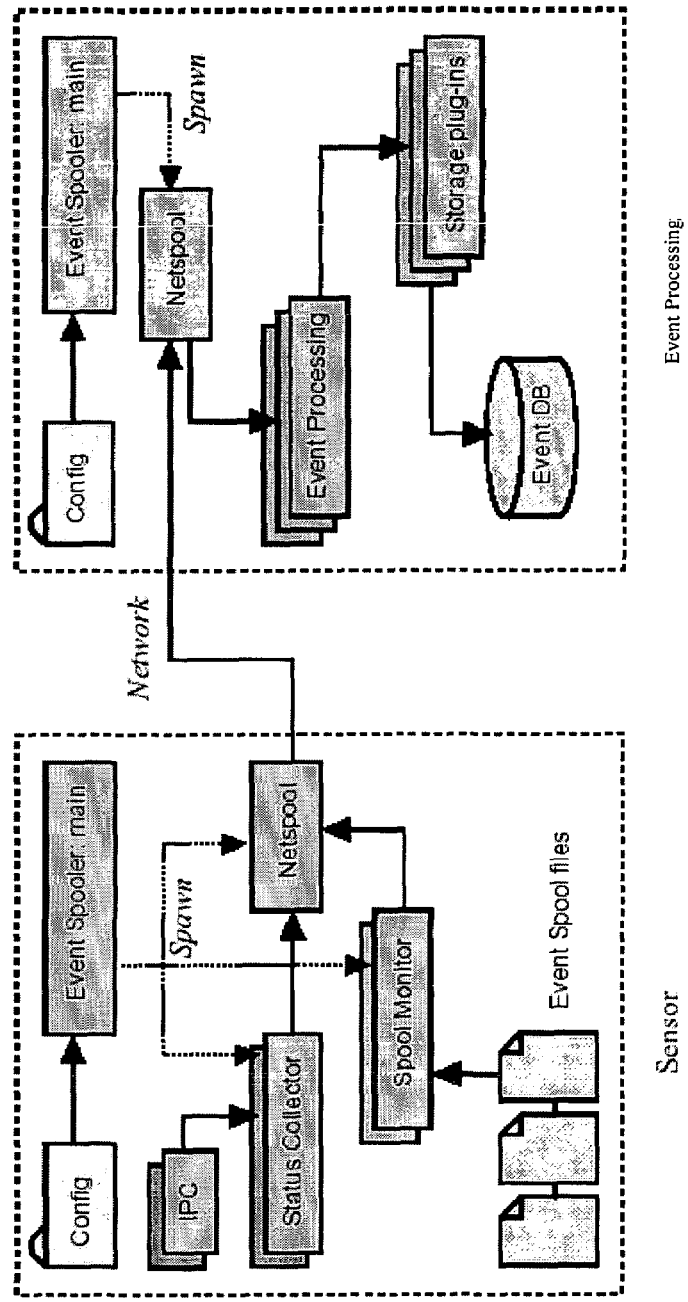
FIG. 28 depicts a block diagram of one embodiment of an event spooler of FIG. 1.

FIG. 28 shows one embodiment of a diagram of the Event Spooler working in distributed mode. A Sensor also has Netspool process running; it may allow local client connections only. Although Spool Monitor and Status Collector can send data, it may have only one source of data stream per appliance. The configuration may provide automatic MUTEX-style locking for every module on the sensor host.

The Event Spooler may collect and transfer events, for example, generated by all modules within an NCAP-based application. The event spooler may be implemented as a multi-process distributed application with specialized sub-processes that may use UNIX IPC and networking to communicate with each other and the rest of the system.

Figure 29:
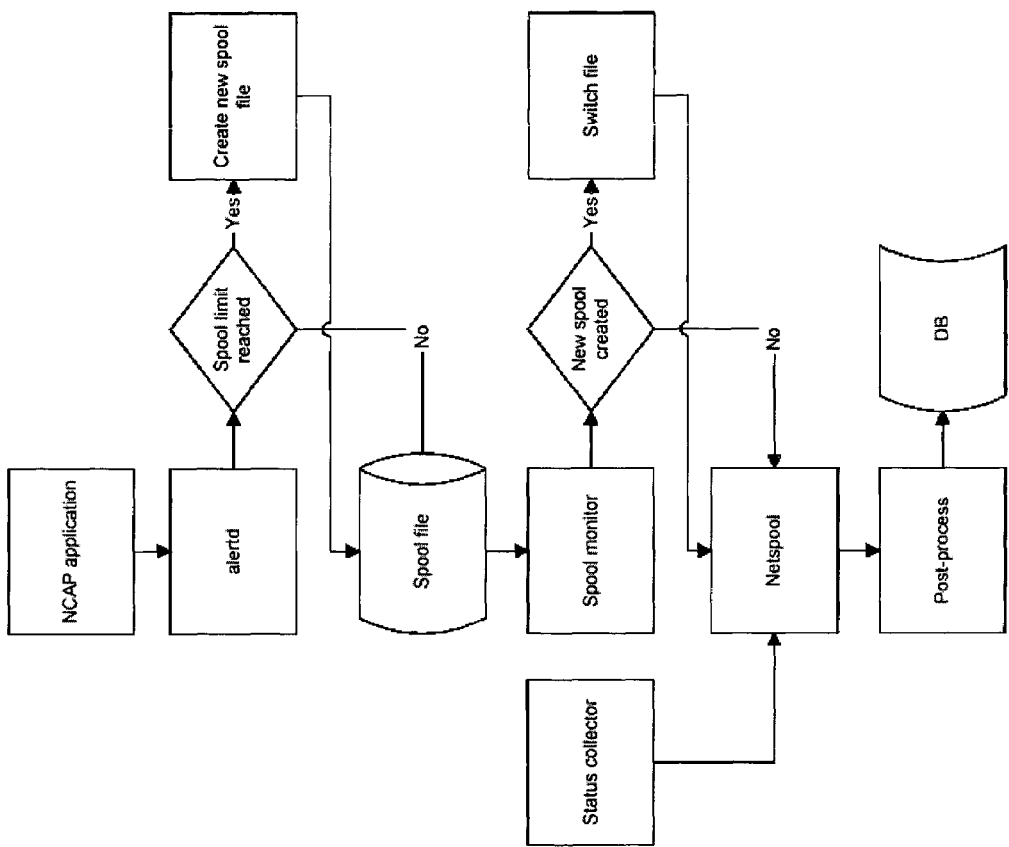
FIG. 29 depicts a flow diagram of one embodiment of an event spooler of FIG. 1.
Figure 30:
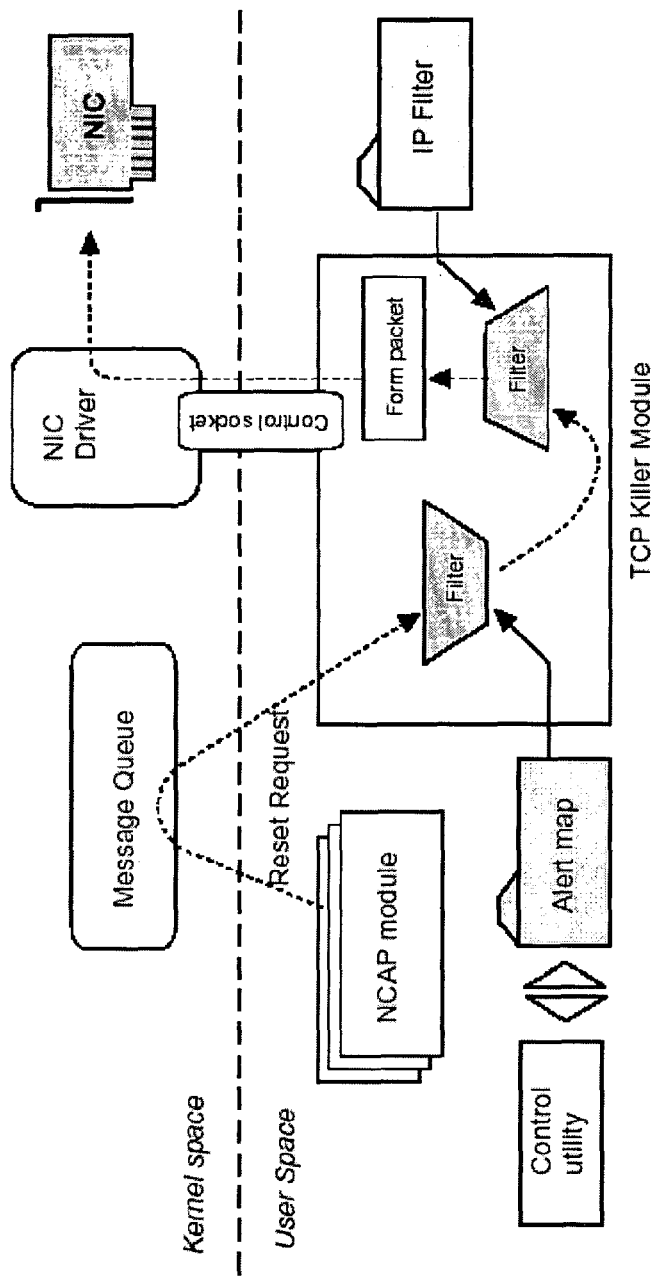
FIG. 30 depicts a block diagram of one embodiment of a TCP killer of FIG. 1.
Figure 31:
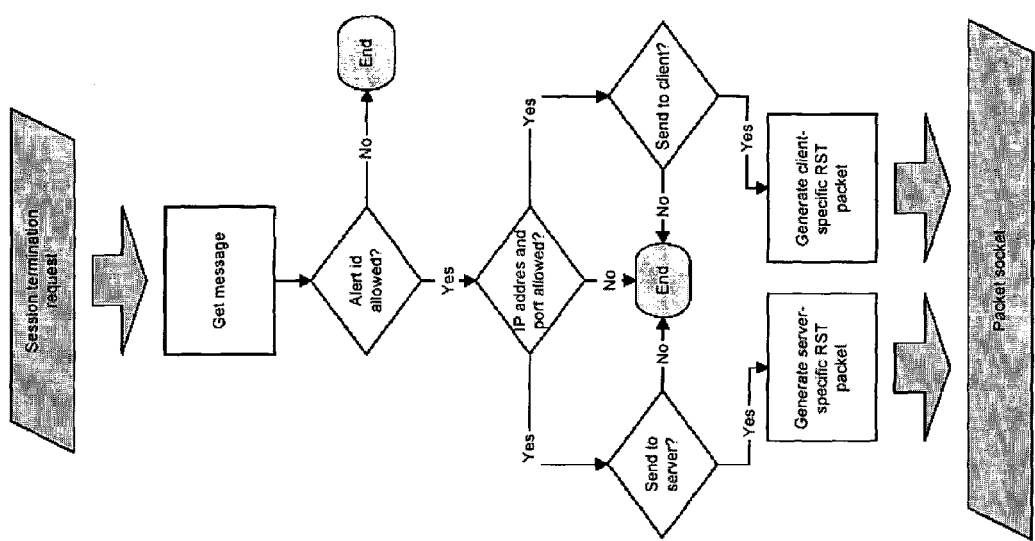
FIG. 31 depicts a flow diagram of one embodiment of a TCP killer of FIG. 1.

A list of sub-processes that may be included in the Event Spooler application follows:
  alertd: collects events from the analysis modules using UNIX messaging. Filters out events that are disabled by the user
  evspool: the spooler process manager
  status collector: saves the shared statistics pool
  spool monitor: takes event data from a particular spool directory The Process Manager may start the alertd process (see FIG. 29), attaching to the IPC message pool and/or mapping the alert map from a file. It may then wait for incoming event frames. Receiving a frame, it may decode the alert id information from the frame and check it against the alert map set. If the alert id is permitted to send, the alertd process may put the frame into the spool file.

The alert frame may be taken from the spool file by the spool monitor, which may be running under evspool supervision. Spool monitor's task may be to pick up frames from the spool file one by one, prepend each frame with a stream label and sensor name, track current spool pointer in the checkpoint file and send the resulting frame to the netspool process. The data may be sent via proprietary, reliable and secure UDP-based protocol. The event data may be kept in the spool file until it is sent. The specially-developed network protocol and checkpoint file may ensure that the application withstands network outages and hardware reboots.

Netspool process may receive the frame and, depending on the configuration, may send it to another netspool or send it to local database plug-ins, or both. Database plug-ins may be implemented as load-on-demand dynamic libraries. The additional layer of post processing may includes event correlation.

Netspool may also collect information from the status collector. Status collector may make a copy of the shared memory segment allocated for NCAP-based application's statistics pool, and send it to the database repeatedly (in preconfigured time intervals).

TCP Killer

One embodiment of a TCP Killer module provides the ability to react to malicious traffic by stopping TCP sessions, for example, in real time.

The TCP Killer module may utilize Linux packet socket API. This interface provides an ability to connect directly to a NIC driver and put an artificially generated packet into its output queue. The driver accepts a complete network packet (including Layer2 headers) from a user-space program, and injects it into the network without modification. If the network analyzer is fast enough, it can generate TCP RST packets to stop an ongoing TCP session if it is deemed malicious.

It can done so by sending a TCP RST packet with proper SEQ and socketpair attributes to both client and server computers. After receiving TCP RST packet on specific socketpair, host's TCP/IP stack may close the connection, flush data buffers and return an error to the user application ('Connection reset by peer' may be the standard error message).

Since a TCP Killer-equipped application can actively interfere with normal network activities, it may have a separate override control over the module's behavior. The TCP Killer module may include control over which session termination requests from an NCAP application are granted and which are ignored. The control mechanism may include a separate configuration file specifying destination address and port ranges to include/exclude from possible reset targets list (IP filters) and a 'bit map' file that allows/disallows reset packet generation for each alert ID, including RST packet direction (alert map).

The TCP Killer module may be implemented as a separate UNIX process that communicates with its clients (e.g., local applications) using UNIX messaging IPC. It may read the IP filters list from the configuration file during startup and map the alert map file to memory in shared mode, allowing changes from tcpkc to be accepted. Restart of the module may be required only if the IP filter information needs to be changed. The standard restart procedure may be provided by the Process Manager. The restart may not affect other processes in a NCAP-based application.

TCP Killer Module API

The TCP Killer API may use UNIX messaging facility. TCP Killer may be attached to the message queue allocated by NCAP core during the startup procedure. The ID of the queue may be known to all NCAP modules.

The TCP Killer process may expect the message buffer in the format described by the tcpk_t structure. The tcpk_t structure may contain the alert id and layer 2/3/4 information necessary to create a TCP RST packet.

TCP Killer Module Initialization

TCP killer may be started by the Process Manager. It may get the NIC name, alert map name and the name of the IP filter configuration file from the command line. It may then read and interpret IP filter information and map the alert map file to memory.

The next act may be to open a control connection to the NIC driver, for example, by opening a packet socket with the specified NIC name. At the end of the initialization phase, the module may set the specified NIC to NOARP mode.

After initialization, the TCP killer may enter an infinite loop that includes waiting for session termination requests, accepting them, filtering the received requests using the IP filter and the alert map, and, if allowed, generating TCP RST packets using information provided in the requests.

As mentioned above, alert map may also specify the direction where to send the packet: client side, server side or both. If both sides are specified, the TCP Killer module may generate and send two packets in a sequence: one is created for the server's side of connection, the other for the client's side.

TCP Killer Module Reconfiguration

The tcpkc command-line utility may provide a way to update the Alert map information. It may modify the specified binary map file; the changes may be instantly available to the running TCP Killer process that keeps this file mapped to its memory.

In order to change the IP filter information, the TCP Killer module may need to be restarted. It may be done by the standard mechanism provided by the Process Manager. Restarting the TCP Killer module may not affect other NCAP-based modules.

TCP Killer Module Unloading

The TCP Killer module may stop when an NCAP-based application finds a reason to exit. The module may not take any specific action, because the UNIX standard exit procedure closes all communication channels and reclaims all the memory used by the process.

A machine-readable medium may include encoded information, which when read and executed by a machine causes, for example, the described embodiments (e.g., one or more described methods). The machine-readable medium may include machine-readable storage medium that store programmable parameters and may also store information including executable instructions, non-programmable parameters, and/or other data. The machine-readable storage medium may comprise read-only memory (ROM), random-access memory (RAM), nonvolatile memory, an optical disk, a magnetic tape, and/or magnetic disk. The machine-readable medium may further include machine readable transport medium, for example, a carrier wave modulated, or otherwise manipulated, to convey instructions that can be read, demodulated/decoded and executed by the machine (e.g., a computer). The machine may comprise one or more microprocessors, microcontrollers, and/or other arrays of logic elements.

In view of the foregoing, it will be apparent to one of ordinary skill in the art that the described embodiments may be implemented in software, firmware, and/or hardware. The actual software code or specialized control hardware used to implement the present invention is not limiting of the invention. Thus, the operation and behavior of the embodiments is described without specific reference to the actual software code or specialized hardware components. The absence of such specific references is feasible because it is clearly understood that artisans of ordinary skill would be able to design software and/or control hardware to implement the embodiments of the present invention based on the description herein.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit, or some other programmable machine or system. As such, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. A method comprising:
   receiving network data;
   processing the network data at one or more decoders to create input data for applying at least multi-dimensional content profiling;
   preventing, by a processor, through the network data, leaks of information by at least applying the multi-dimensional content profiling; and
   wherein the multi-dimensional content profiling comprises:
   loading one or more profiles, wherein the one or more profiles each comprise an expected set of statistical characteristics of data;
   continuously receiving the input data from the one or more decoders;
   determining a probabilistic measure of membership of the input data relative to the one or more profiles;
   comparing the probabilistic measure with a threshold requirement for each of the one or more profiles; and
   preventing leaks of the information if the probabilistic measure meets the threshold requirement.

2. The method of claim 1, wherein the information includes a digital asset.

3. The method of claim 1, wherein the multi-dimensional content profiling takes into account the structure of the information.

4. The method of claim 1, wherein processing the network data at the decoder chain comprises extracting data by removing one or more layers of content encoding selected from the group consisting of common compression, aggregation, file formats, encoding schemas, and combinations thereof.

5. The method of claim 1, further comprising creating the profile by:
   loading positive training sets of documents;
   representing each document from the positive training sets of documents as a point in multi-dimensional space;
   separating the individual points in the multi-dimensional space with a set of hyperplanes wherein the set of hyperplanes effectively separate the multi-dimensional space into regions representing the positive training sets of documents; and
   converting the set of hyperplanes into the profile.

6. The method of claim 5, further comprising creating the profile by:
   loading negative training sets of documents;
   representing each document from the negative training sets of documents as a point in multi-dimensional space;
   separating the individual points in the multi-dimensional space with a set of hyperplanes wherein the set of hyperplanes effectively separate the multi-dimensional space into regions representing the negative training sets of documents; and
   converting the set of hyperplanes into the profile.

7. The method of claim 1, wherein determining the probabilistic measure comprises updating one or more counters in a predetermined order, calculating values of output dimensions based on the one or more counters, and calculating an output score based on the output dimensions wherein the output score represents the probabilistic measure.

8. The method of claim 1, wherein the preventing operates in real-time.

9. The method of claim 1, further comprising terminating sessions with leaks of information before the network data is fully transferred.

10. The method of claim 1, further comprising preventing, through the network data, leaks of information by also applying keyword scanning.

11. A machine-readable storage medium having encoded information, which when read and executed by a machine causes a method comprising:
   receiving network data;
   processing the network data at one or more decoders to create input data for applying at least multi-dimensional content profiling;
   preventing, through the network data, leaks of information by at least applying multi-dimensional content profiling; and
   wherein the multi-dimensional content profiling comprises:
      loading one or more profiles, wherein the one or more profiles each comprise an expected set of statistical characteristics of data;
      continuously receiving the input data from the one or more decoders;
      determining a probabilistic measure of membership of the input data relative to the one or more profiles;
      comparing the probabilistic measure with a threshold requirement for each of the one or more profiles; and
      preventing leaks of the information if the probabilistic measure meets the threshold requirement.

12. The machine-readable storage medium of claim 11, wherein the profile is created by:
   loading positive training sets of documents;
   representing each document from the positive training sets of documents as a point in multi-dimensional space;
   separating the individual points in the multi-dimensional space with a set of hyperplanes wherein the set of hyperplanes effectively separate the multi-dimensional space into regions representing the positive training sets of documents; and
   converting the set of hyperplanes into the profile.

13. The machine-readable storage medium of claim 12, wherein the profile is created by:
   loading negative training sets of documents;
   representing each document from the negative training sets of documents as a point in multi-dimensional space;
   separating the individual points in the multi-dimensional space with a set of hyperplanes wherein the set of hyperplanes effectively separate the multi-dimensional space into regions representing the negative training sets of documents; and
   converting the set of hyperplanes into the profile.

14. The machine-readable storage medium of claim 11, further comprising receiving the network data at a decoder chain prior to implementing the multi-dimensional content profiling, wherein the decoder chain extracts data by removing one or more layers of content decoding selected from the group consisting of common compression, aggregation, file formats, encoding schemas, and combinations thereof 15. The machine-readable storage medium of claim 11, wherein the multi-dimensional content profiling further comprises establishing a connection with an alert module prior to sending the reactive measure.

16. The machine-readable storage medium of claim 11, wherein the calculating the set of output dimensions comprises determining one or more values for each counter and combining the one or more values for each counter to create the set of output dimensions.

17. An apparatus comprising:
   a receiver to receive network data;
   a processor, coupled to the receiver, to prevent, through the network data, leaks of information by at least applying multi-dimensional content profiling, wherein the processor processes the network data at one or more decoders to create input data for applying at least the multi-dimensional content profiling;
   the multi-dimensional content profiling comprising:
      loading one or more profiles, wherein the one or more profiles each comprise an expected set of statistical characteristics of data;
      continuously receiving the input data from the one or more decoders;
      determining a probabilistic measure of membership of the input data relative to the one or more profiles;
      comparing the probabilistic measure with a threshold requirement for each of the one or more profiles; and
      preventing leaks of the information if the probabilistic measure meets the threshold requirement.

18. The apparatus of claim 17, wherein the calculating an output score is performed for each of the one or more profiles.

* * * * *